United States Patent
Southworth et al.

(10) Patent No.: US 11,700,209 B2
(45) Date of Patent: Jul. 11, 2023

(54) MULTI-PATH PACKET DESCRIPTOR DELIVERY SCHEME

(71) Applicant: Intel Corporation, Santa Clara, CA (US)

(72) Inventors: Robert Southworth, Chatsworth, CA (US); Karl S. Papadantonakis, Agoura Hills, CA (US); Mika Nystroem, Pasadena, CA (US); Arvind Srinivasan, San Jose, CA (US); David Arditti Ilitzky, Zapopan (MX); Jonathan Dama, Encino, CA (US)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 16/727,543

(22) Filed: Dec. 26, 2019

(65) Prior Publication Data
US 2020/0136986 A1    Apr. 30, 2020

Related U.S. Application Data

(60) Provisional application No. 62/908,490, filed on Sep. 30, 2019.

(51) Int. Cl.
*H04L 47/625* (2022.01)
*H04L 49/901* (2022.01)
*H04L 67/568* (2022.01)

(52) U.S. Cl.
CPC ........ *H04L 47/6255* (2013.01); *H04L 49/901* (2013.01); *H04L 67/568* (2022.05)

(58) Field of Classification Search
CPC ......... H04L 47/62–6295; H04L 49/901; H04L 65/56–5683
See application file for complete search history.

(56) References Cited

U.S. PATENT DOCUMENTS

| | | | | |
|---|---|---|---|---|
| 6,157,955 | A  * | 12/2000 | Narad ................. | G06F 9/30094 709/228 |
| 6,904,043 | B1 * | 6/2005  | Merchant ............... | H04L 69/22 370/428 |

(Continued)

FOREIGN PATENT DOCUMENTS

WO    2014173296 A1    10/2014

OTHER PUBLICATIONS

International Search Report and Written Opinion for PCT Patent Application No. PCT/US20/36851, dated Sep. 17, 2020, 15 pages.

(Continued)

*Primary Examiner* — Chi H Pham
*Assistant Examiner* — Vladislav Y Agureyev
(74) *Attorney, Agent, or Firm* — Compass IP Law PC

(57) ABSTRACT

Examples describe use of multiple meta-data delivery schemes to provide tags that describe packets to an egress port group. A tag, that is smaller than a packet, can be associated with a packet. The tag can be stored in a memory, as a group with other tags, and the tag can be delivered to a queue associated with an egress port. Packets received at an ingress port can be as non-interleaved to reduce underrun and providing cut-through to an egress port. A shared memory can be allocated to store packets received at a single ingress port or shared to store packets from multiple ingress ports.

23 Claims, 18 Drawing Sheets

(56) References Cited

U.S. PATENT DOCUMENTS

| | | | | |
|---|---|---|---|---|
| 7,433,364 B2* | 10/2008 | Chandra | ............... | G06F 13/128 370/428 |
| 7,457,296 B2* | 11/2008 | Kounavis | ................. | H04L 47/50 370/400 |
| 7,489,625 B2 | 2/2009 | Varma | | |
| 7,558,890 B1* | 7/2009 | Li | ....................... | H04L 49/9047 370/230.1 |
| 8,050,263 B1* | 11/2011 | Walsh | ................. | H04L 49/3027 370/390 |
| 8,467,342 B2* | 6/2013 | Loh | ......................... | H04L 47/11 370/329 |
| 8,868,790 B2 | 10/2014 | Lovett et al. | | |
| 9,094,343 B1* | 7/2015 | Kunz | ..................... | H04L 47/32 |
| 9,571,396 B2 | 2/2017 | Talaski et al. | | |
| 10,708,189 B1* | 7/2020 | Agrawal | ............. | H04L 49/3009 |
| 2009/0089459 A1* | 4/2009 | Jeyaseelan | ............ | G06F 13/128 710/7 |
| 2010/0142537 A1 | 6/2010 | Lee et al. | | |
| 2012/0155256 A1* | 6/2012 | Pope | ................... | H04L 49/3018 370/412 |
| 2016/0036731 A1* | 2/2016 | Srinivasan | .......... | H04L 49/9015 370/417 |
| 2016/0173395 A1* | 6/2016 | Danielsson | ............. | H04L 47/28 370/236 |
| 2019/0373086 A1* | 12/2019 | Qi | ......................... | H04L 47/365 |
| 2020/0136986 A1 | 4/2020 | Southworth et al. | | |
| 2020/0412670 A1* | 12/2020 | Arditti Ilitzky | ..... | H04L 49/3072 |

OTHER PUBLICATIONS

Chen, Yanpei, et. al., "Understanding TCP Incast Throughput Collapse in Datacenter Networks", RAD Lab, EECS Dept. UC Berkeley, WREN'09, Aug. 21, 2009, Barcelona, Spain., 10 pages.

Chuang, Shang-Tse, et. al., "Matching Output Queueing with a Combined Input/Output-Queued Switch", IEEE Journal on Selected Areas in Communications, vol. 17, No. 6, Jun. 1999, 10 pages.

Hluchyj, Michael G. et. al., "Queueing in High-Performance Packet Switching", IEEE Journal on Selected Areas in Communications, vol. 6, No. 9, Dec. 1988, 11 pages.

Mneumneh, Saad, et. al., "Switching Using Parallel Input-Output Queued Switches With No Speedup", IEEE/ACM Transactions on Networking, vol. 10, No. 5, Oct. 2002, 13 pages.

Podlesny, Maxim, et. al., "Solving the TCP-incast Problem with Application-Level Scheduling", D.R. Cheriton School of Computer Science University of Waterloo, 200 University Avenue West, Waterloo, ON N2L 3G1, Canada, IEEE, Sep. 13, 2012, 8 pages.

CS 5372, "Specification and Design of Real-Time Systems", Lecture 7: Real-Time I/O, Partitioning, and Memory, Jun. 20, 2018, 17 pages.

* cited by examiner

MULTI-PATH PACKET DESCRIPTOR DELIVERY SCHEME

RELATED APPLICATION

The present application claims the benefit of the priority date of U.S. provisional patent application Ser. No. 62/908,490, filed Sep. 30, 2019, the entire disclosure of which is incorporated herein by reference.

BACKGROUND

In the field of data communications, switches are used to receive packets at one or more ingress ports and forward packets, through the switch fabric, to the target egress port for transmission to an intermediate node or endpoint destination receiver. In switches, an egress pipeline may make a determination of which packets to permit to egress from an egress port and which packets to drop. This determination is based on the header and metadata of the packet. However, bandwidth for fetching packet segments from the switch fabric into the egress port is limited and is essentially wasted whenever a packet is dropped. Bandwidth for fetching packet segments from a switch is wasted because the data is fetched but not egressed on the wire (e.g., network medium). This can result in loss of bandwidth utilization on the wire (so called "bubbles") arising from gaps between packets egressed on a wire even if there are packets ready to be fetched and egressed.

DETAILED DESCRIPTION

Ethernet switches require several hundred megabytes of packet memory due to the unscheduled nature of arrivals. Ethernet switches generally use the following memory organization: input buffer, output buffer, and/or completely shared buffer (queueing). See, e.g., Michael G. Hluchyj and Mark J. Karol, Queueing in High-Performance Packet Switching. IEEE Journal on Selected Areas in Communications, Vol. 6, No. 9, December 1988. Input and output buffers can be implemented by subdividing a buffer into small buffers, each using enough throughput for only a small group of ports (1-2 Tbps).

Figure 1:
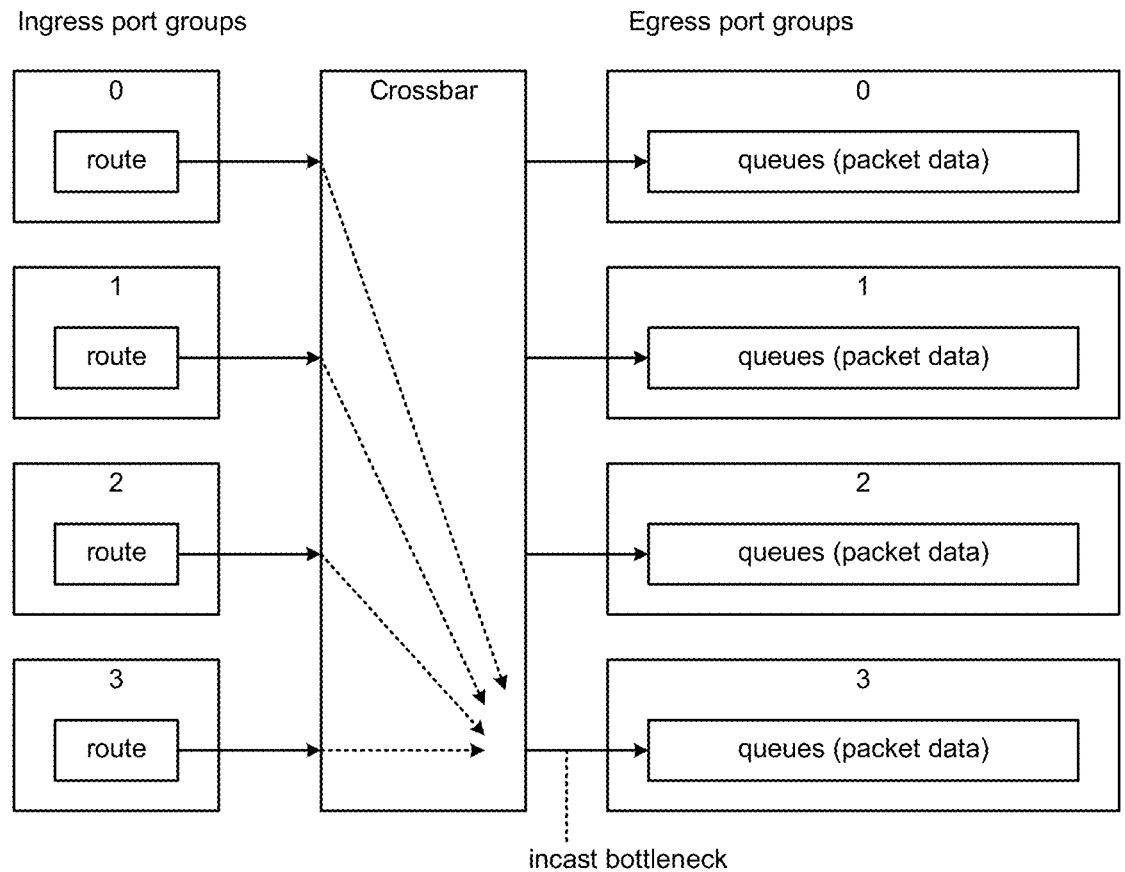
FIG. 1 depicts an example of a system.

FIG. 1 depicts an example of a system that uses a crossbar switch to provide packets from an ingress port to an egress port. In this example, a crossbar switch uses direct-queued output buffers. The system can experience a throughput bottleneck in incast applications that deliver simultaneous bursts to a single output queue. The crossbar switch experiences an incast bottleneck when every egress port group must support the full ingress throughput of the entire switch.

Maxim Podlesny and Carey Williamson, Solving the TCP-incast Problem with Application-Level Scheduling. 2012 IEEE 20th International Symposium on Modeling, Analysis and Simulation of Computer and Telecommunication Systems describes that TCP incast can be solved at the application or TCP stack level. However, this approach changes the application behavior and therefore introduces other overhead. Also, there are many constraints on application and TCP stack design, so changing them may be difficult. Finally, these solutions do not address the incast problem in other protocols.

Yanpei Chen, Rean Griffith, Junda Liu, Randy H. Katz, and Anthony D. Joseph, Understanding TCP Incast Throughput Collapse in Datacenter Networks 2009 Proceedings of the 1st ACM Workshop on Research on Enterprise Networking (WREN 2009) describes a scenario in a typical Transmission Control Protocol (TCP) incast application where hundreds of input flows (possibly arriving on all ports within a single ingress port group) simultaneously deliver bursts of 256 KB each to the switch. In a large switch (e.g., 10 Tbps or more), the input and output buffers are highly subdivided, and are not large enough to hold a burst of 10 MB. Input buffering can be better than output buffering in this case, but may suffers cases where many flows arrive on a single ingress port group, or if all outputs are congested.

Shang-Tse Chuang, Ashish Goel, Nick McKeown, and Balaji Prabhakar, Matching Output Queueing with a Combined Input Output Queued Switch, Infocom (1999) describes output queueing implemented via an internal switch that is faster than the external bandwidth. This may be unfeasible for a large switch. For example, implementing a 50 Tbps core for a 25 Tbps switch may not be feasible. In addition, while the approach potentially address the blocking problem of input queues, the approach does not share per-port memory.

Saad Mneimneh, Vishal Sharma, and Kai-Yeung Siu, Switching Using Parallel Input-Output Queued Switches with No Speedup. IEEE/ACM Transactions on Networking, Vol 10, No 5, October 2002 describes output-queueing solutions that employ many switches connected in parallel. The approach prevents inputs from blocking each other when they are contending for the same output. However, the packet storage is not shared between the switches. Therefore, a connection between a single port pair is unable to use the full shared memory. This only partially solves the incast problem.

Incast creates throughput challenges that can be addressed by using shared memory. In any end-to-end rate-controlled protocol (like TCP or Remote Direct Memory Access (RDMA)), the burst size is determined by the roundtrip time of the protocol, which can be milliseconds. Therefore, for a chip supporting 400 Gbps of active incast, there can be 100 MB of burst, which can use the entire chip memory. Consider two 100 Gbps ingress ports each sending 100 MB bursts to a single 100 Gbps egress port. If the chip has 100 MB of memory and it is all available to the single active port in this example, then there is no backpressure. If the memory were not sharable between all input or output ports, then most of it would be unavailable for holding a burst.

Output queueing is an approach where an egress port has its own queues. Output queueing allows packets arriving on the same input port but going to different outputs port to not block each other, even if one of those output ports is blocked. For example, these queues could be allocated per-flow or per Traffic Class (TC). One or more flows can be assigned to a TC. As used herein, a flow can refer to a TC and vice versa. Accordingly, the number of output queues in a switch can be represented as: (#egress ports)×(#TCs). However, output queuing may not scale well because all data entering a switch goes to the same queue at the same time and keeps them ordered at throughput.

Various embodiments enable the use of a shared packet memory in switches by introducing a queueing structure that combines direct communication between input and output ports using a shared memory. Incast behavior can be addressed using shared memory and an output queueing model, while using on-chip memory efficiently and also with low latency. Shared memory can be used for both packet data and queueing metadata, or tags. Tags (e.g., 6 bytes to represent 256 bytes of data) can be transmitted using a tag distribution bus that supports full incast throughput. The tag distribution bus may be used in place of a traditional crossbar. On the ingress side, a tag sequencer is used to reduce the number of output queue slices by a factor N, where N=(number of ports per input group). A queue cache structure, on the egress side, can "hide" the latency of shared memory by storing tags prior to availability in shared memory or by tags being accessible (read) before the tags are retrievable (read) from shared memory.

Various embodiments provide a shared memory data structures accessible by management application program interfaces (APIs) available to users (e.g., applications, orchestrators, hypervisors, virtual machines, containers). Shared memory could be partitioned between queue and packet data usage.

Figure 2:
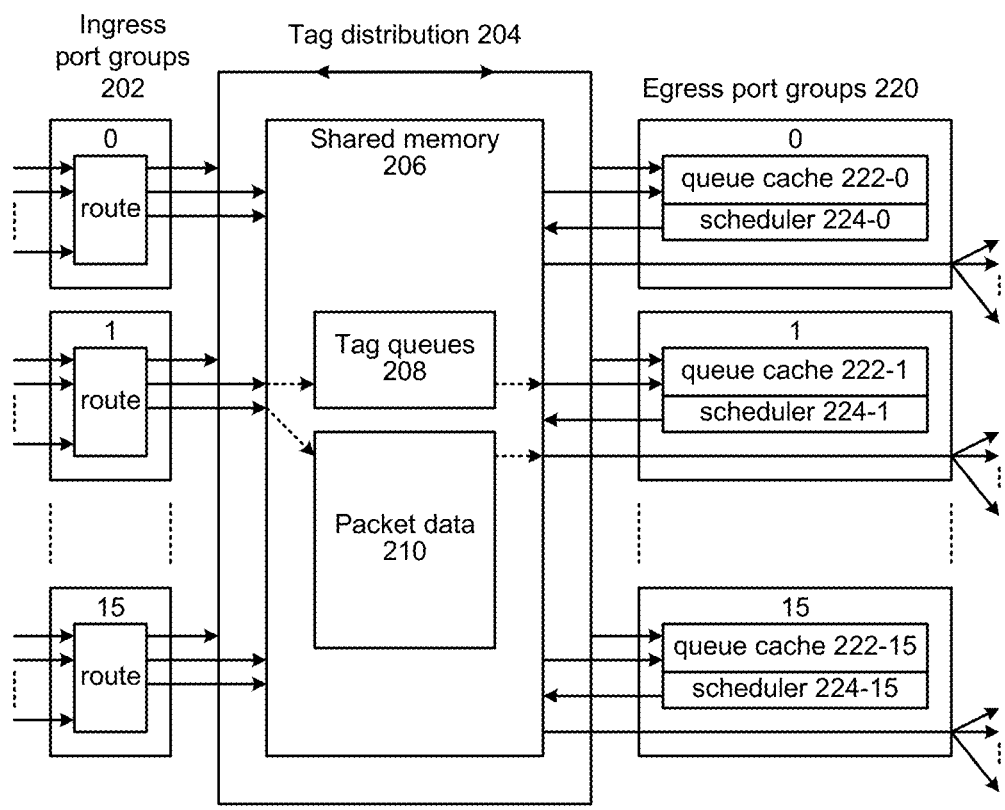
FIG. 2 depicts an example switch.

FIG. 2 depicts an example switch. The switch can receive packets using ingress ports among an ingress port group 202. Ingress ports can receive packets from a network medium compliant with any standard, including Ethernet, transmission control protocol (TCP), User Datagram Protocol (UDP), FibreChannel, InfiniBand, OmniPath, Intel QuickPath Interconnect (QPI), Intel Ultra Path Interconnect (UPI), Intel On-Chip System Fabric (IOSF), InfiniBand, Compute Express Link (CXL), HyperTransport, high-speed fabric, Peripheral Component Interconnect Express (PCIe), NVLink, Advanced Microcontroller Bus Architecture (AMBA) interconnect, OpenCAPI, Gen-Z, CCIX, NVMe over Fabrics (NVMe-oF) (described at least in NVM Express Base Specification Revision 1.4 (2019)), and variations thereof, and so forth.

In this example, a shared memory switch is used. Ingress ports are grouped into M port groups where each ingress port supports ingress at a particular rate. Other switch rates and ingress and egress rates can be used. A port group can include an ingress port group among ingress port groups 202 that receives packets and an egress port group among egress port groups 220 that sends packets to a network medium or fabric. When an ingress port group receives a packet, the ingress port group writes the packet to shared memory 206 in packet data blocks (e.g., 256B) into at least one deep queue (e.g., tag queues 208) (for unicast or multicast). In this example, packet data is stored in shared memory 206, but packet data can be stored in any packet data buffering structure, including partitioned structures. Ingress port groups 202 can also perform routing (e.g., packet analysis) to select an output queue for the packet.

Some technologies such as Omnipath and InfiniBand have alternate approaches to managing incast and do not use shared memory. Nonetheless, these other technologies can also make use of the proposed low-latency tag queueing schemes.

Note that embodiments can be used for egressing packets from a network interface.

In some embodiments, a switch can be implemented using a server or data center that uses software defined networking (SDN), network functions virtualization (NFV), and so forth to perform operations of a switch and accesses the server's shared memory. In some embodiments, a network appliance can perform operations of a switch and can apply SDN or NFV. NFV can be used for load balancing (egress port balancing and load balance service to process packet). In some examples, processing of packets can occur before egress and while packets are stored in shared memory. Processing can include one or more of: firewalling, TCP termination, access control list, service function chains (firewall, access control, decapsulation, packet processing), router, firewall, email server, Domain Name System (DNS), virtual private network (VPN), backup and remote file sharing.

According to various embodiments, for a packet data block (e.g., 256B) written to shared memory 206, an ingress port group generates a tag with pointer to data in shared memory 206. The ingress port group generates a tag pointing to and describing the data block. A tag can include identify an egress port of a packet and its traffic class as well as identifiers of memory addresses that store one or more packet data blocks. A tag can be 6 bytes and points to and describes the data block. An example of a tag can include one or more fields in the following format:

| Bits | Field | Description |
|---|---|---|
| 20 | ptr | Address of segment (20 b allows for up to 256 MB of 256 B segments) |
| 4 | ptr_toggle | Semaphore bits for segment pointer |
| 8 | length | At EOP: length of packet data in current segment, in bytes (0 represents 256 B). If not at EOP: the number of bytes in the segment is known (256 B if not SOP; 192 B if at SOP). In that case, this field represents the total number of segments of the packet, or 0 if that information is not available. Ingress will provide this data on a best-effort basis; if not available, egress must assume the packet can be up to 10 KB in length. |
| 1 | SOP | Start Of Packet |
| 1 | EOP | End Of Packet |

| Bits | Field | Description |
| --- | --- | --- |
| 1 | err_xmd | At SOP: set if eXtended MetaData (64 B metadata) is used. Extended metadata is always used for multi-segment packets, but is optional for single-segment packets. If at EOP and not SOP: set to indicate a packet error such as bad CRC on ingress. If transmitted, the packet must be terminated with a bad CRC. (Note single-segment packets do not have an error flag; errored single-segment packets are to be dropped in ingress and no tag transmitted.) |
| 1 | mirrored | Set on the original copy of a mirrored packet. Indicates memory reference count must be checked before packet memory is freed. |
| 1 | at_egr_rate | Set if packet is eligible for cut-through handling (remaining segments are guaranteed to be sent at the egress port rate) |
| 4 | src_port | Local logical source port within ingress MGP (if not Virtual Port (VP)); used for CM and policer accounting |
| 1 | src_port_vp | Set if local source port is Virtual Port (VP); used for CM and policer accounting |
| 3 | src_TC | Traffic class on ingress; used only for CM accounting |
| 3 | SLL | Switch Lifetime Limit, used for packet timeout. This 3 b timestamp represents the time the packet entered the switch; it is copied from a configurable 3 b range of the high-resolution ingress timestamp. |
| 48 | Total | |

For a packet data block (e.g., 256B) written to shared memory 206, a tag is written to a slice of a deep queue of shared memory 206 and also sent to a slice of a queue cache within the egress port group via a tag distribution 204. Shared memory 206 can be accessed a minimum of one 64B word at a time. To reduce pointer handling, words can be allocated in 256B blocks.

According to various embodiments, a tag is sent via a tag distribution bus to a slice of a queue cache (buffer) associated with an egress port group. The tag is also packed (collated) to be written to a slice of a deep queue in shared memory 206 in a word so that one or more words filled (or at least partially filled) with tags can be written into shared memory 206. Tag distribution 204 can be an interconnect between ingress port groups 202 and egress port groups 220 that allows the full throughput of tags of an ingress port group to be accepted at an egress port group, even when all ingress port groups are sending to the same egress port group. For example, tag distribution 204 can include separate bus lanes, where a bus lane is driven by an ingress port group. An egress port group can read from any or all bus lanes of any or all ingress port groups in a clock cycle. A bus lane receives tags from an ingress port group and delivers tags from a single ingress port group to one, some, or all egress port groups. For unicast traffic, one of the egress port groups will consume the tag. For multicast traffic, multiple of the egress port groups consume the tag. For multicast traffic, write packet data once to memory and any egress port reads the packet data. Multicast tags can be handled using a multicast engine communicating with egress via the tag distribution bus or replication of tags at ingress to store in shared memory for access by any of multiple egress queues in parallel.

A cache slice is associated with an egress port group. A cache slice receives direct tags from a single ingress port group via a lane of tag distribution 204. For queues that contain few tags, the queue cache holds all tags within its tail and head buffers, and completely bypasses the shared memory latency. The queue cache (e.g., buffer) is associated with an egress port group, and can include 16 queue cache slices, as shown below. A cache slice can be a region of cache (e.g., level 1, level 2, lower level cache), memory (volatile, non-volatile, persistent memory, byte addressable memory). A cache can be configured as an N-way set associative cache.

When the queue depth of the deep queue is sufficiently low such that the tags are accessible by the egress port group from the queue cache 222, then the deep queue of shared memory 206 does not need to be read, except for deallocating the queue itself. When the queue depth of the deep queue exceeds what can be mirrored in a queue cache 222, then only tags at the head and tail are stored in the queue cache, and queue cache 222 fetches the rest of the tags from the deep queue (e.g., tag queues 208) as needed, in a way that hides the latency of reading from the deep queue.

To attempt to prevent incast situations from affecting egress rate for packets from an ingress port, an egress port group can receive the full ingress tag rate of the switch. For example, a 1.6 Tbps ingress port group can generate tags at 2.4 GHz (the maximum packet rate for 4×400 Gbps Ethernet). Therefore, the egress port group can receive tags at 16×2.4 GHz (to support 16 port groups).

Shared memory 206 can be used to store data packets and tags. Ingress port groups 202 can provide packets and tags to shared memory 206 and shared memory 206 can provide packets and tags to egress port groups 220. In some cases, shared memory 206 can get overloaded and back pressure ingress ports which can cause packet drop.

An egress port group can use a queue cache 222-$n$, where n is 0 to 15. Queue cache 222 associated with an egress port receives a tag and counts it. Queue cache 222 can use a head cache that stores tags at head of deep queue. Queue cache 222 can use a tail cache that stores tags at tail of deep queue. Egress port groups 220 can use a scheduler 224 that chooses a queue and pulls tags from queue and fetches data for egress. For example, an egress port group 220-0 to n can use associated queue cache 222-0 to n and scheduler 224-0 to n.

Handling tags separately from data can assist with throughput scaling. For example, when there are 16 ingress port groups and 16 egress port groups, while an egress group enqueues tags into its queue cache at a rate of 16×2.4 GHz, its data block rate is 1×2.4 GHz. The egress port group reads the data after dequeuing tags, which occurs at the port group's maximum packet rate (e.g., 2.4 GHz). Tag distribution 204, in combination with queue cache 222, can hide latency of reading data from the deep queues from shared memory. A number of ports in an ingress or egress port group can be 2, 4, 8, or any multiple of 2.

Scaling is made possible by at least one or more of the following attributes. Tags are much smaller than the data. For example, a 6 B tag represents 256 B of data. This allows egress to permute and interleave packets in much smaller memory structures than what would be needed if the data were directly streamed through to queue caches of egress ports. Deep queues and queue caches 222 are sliced per ingress port group. Queue caches 222 have the option to discard most tags, as they also exist in shared memory 206 and can be re-read (with the exception of a few tags that may not be written to the shared memory, explained later).

Figure 3:
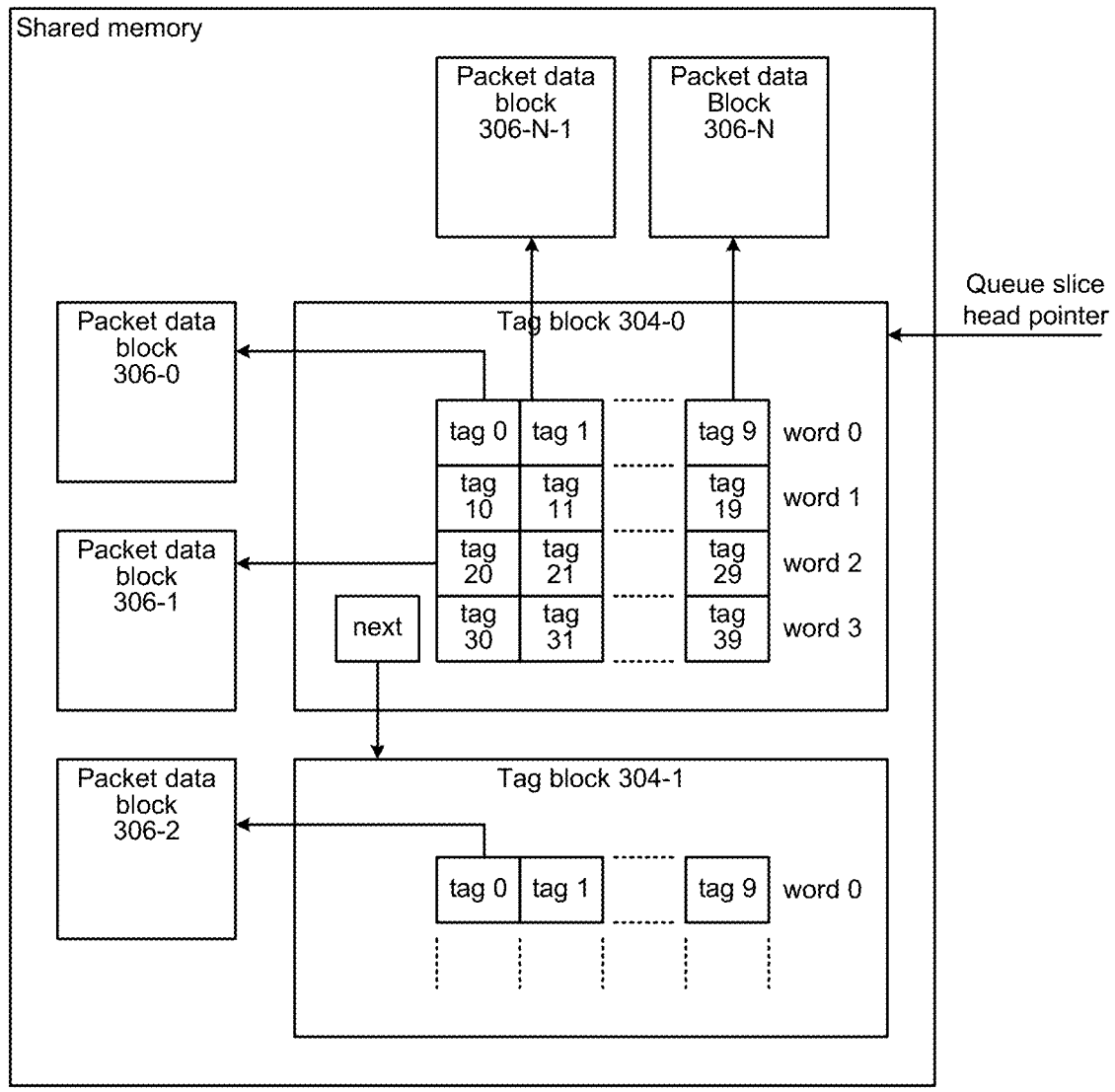
FIG. 3 depicts an example manner of associating tags with packet data in shared memory data system.

FIG. 3 depicts an example manner of associating tags with packet data in shared memory data system. Shared memory 302 can include tag blocks 304-0 and 304-1 and packet data blocks 306-0 to 306-N. A deep queue can be formed as a linked list of tag blocks 304-0 or 304-1 in shared memory. In some examples, packet data can be written to shared memory in 256 B blocks, although other sizes can be used such as 512 B, 1024 B, or other multiples of 128 B. In some examples, a tag is 6 bytes (6 B) in length, although other sizes can be used. Accordingly, for a block of data, a 6 B tag is generated. Based on the example block and tag size, in this example, 40 tags are packed into a 256 B tag block. In addition, a tag block 304-0 or 304-1 can include a next pointer (4 bytes) (for a linked list) to identify a next tag block. Packing tags into a tag block 304-0 or 304-1 can reduce a number of requests and number of buses used to transport blocks.

Writing the tag blocks one 64 B word at a time can reduce the required size of the tail buffer in the queue cache, as discussed below.

Figure 4:
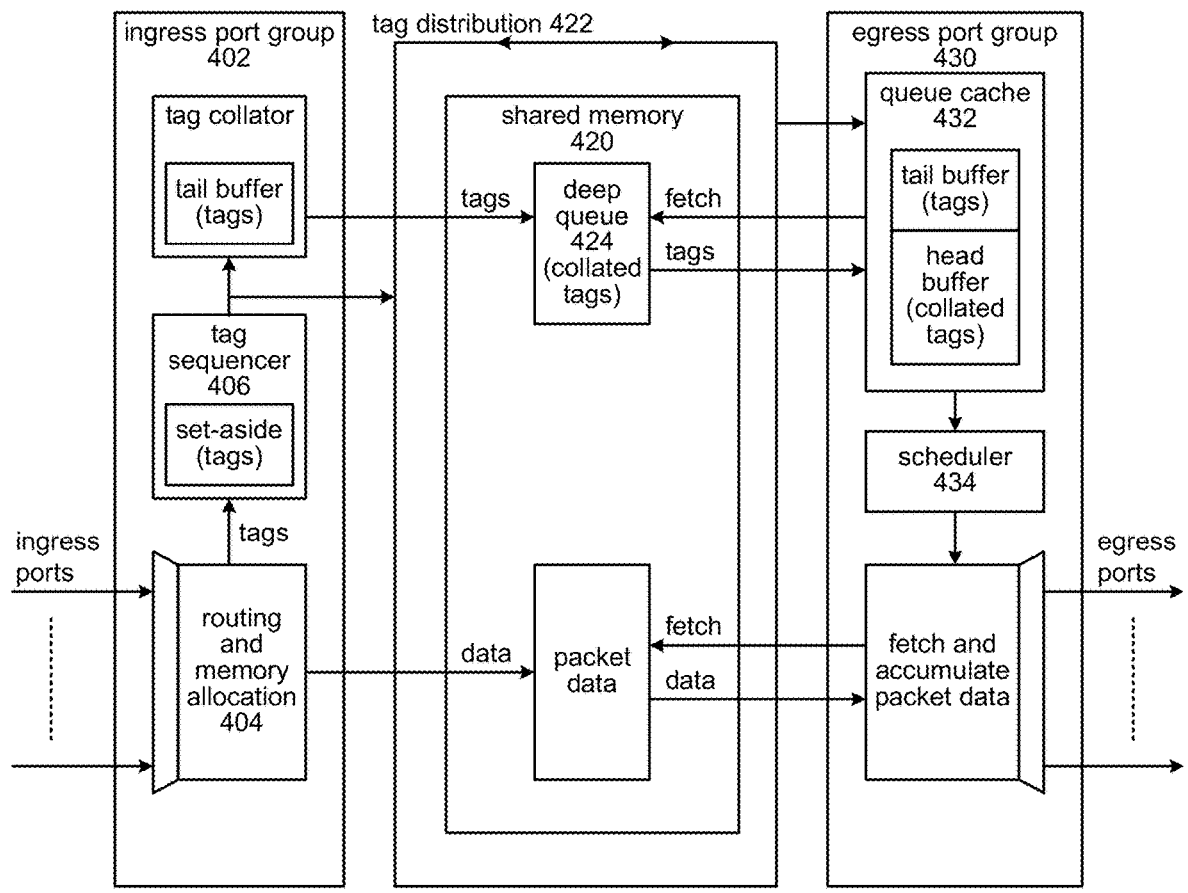
FIG. 4 depicts an example system.

FIG. 4 depicts an example system that uses a tag distribution system to provide tags to shared memory 420 and a queue cache 432 associated with one or more egress ports. An ingress port group 402 can use routing and memory allocation to process packets received from ports of an ingress port group. Routing and memory allocation 404 can allocate and write packet data into shared memory 420 and select an output queue. An ingress port group can be paired with an egress port group. An ingress port group can use tag sequencer 406 for sharing of a single queue slice over all ingress ports (e.g., 16) within an ingress group. Packets from different ingress port groups write to different slices. An output queue can be split by a number of ingress port groups. Packets can be transmitted contiguously and deinterleaved at ingress before made available for transmission.

To attempt to not interleave partial packets within a single queue, when multiple packets are simultaneously streamed into the same output queue, tag sequencer 406 streams the first packet's tags onto the tag distribution connection 422 (e.g., bus or interconnect) (to support cut-through), while setting aside the other packets' tags. Due to the possibility of overlapping ingress packets, an output queue is (a priori) sliced by ingress port to support contiguous non-interleaved transmission of packets on an output port and an aggregate multiple writes per cycle. A full partitioning would require [(#ingress ports)×(#egress ports)×(#TCs)] queue slices, which is >100K queues in a large switch, and at least [(#ingress ports)×(#egress ports)] separate memory regions. Partitioning is used to prevent queue memory structures from dominating the chip area. Tag sequencer 406 can group the ingress ports to cut down on use of memory structures.

Ingress port group 402 can use tag collator 406 to pack up tags (e.g., 10) for each deep queue 424 in shared memory 420. In some examples, when there are 10 tags, tag collator writes tags to shared memory as a 64 B word. Even though the egress group also has a tail buffer, it would not have enough shared memory throughput to write tag blocks in an incast situation. Tag distribution is split to simultaneously allow any single flow to use the entire shared memory for packet data and bypassing the shared memory subsystem entirely to provide notification to the egress port, to reduce notification latency to the egress port.

Egress port group 430 can use a queue cache that contains a cache slice per ingress port group. In some cases, queue cache 432 holds all tags within its tail and head buffers, and shared memory 420 is not used and its latency does not impact packet egress rate. When the queue depth is sufficiently low that all the tags are accessible in the tail and head buffers, then deep queue 424 in shared memory 420 does not need to be read, except for deallocating the queue itself.

A cache slice is connected to one of the lanes or paths of tag distribution 422 to receive and transfer all tags from one of the ingress port groups to a cache slice in the queue cache. An egress port group implements (#TCs)×(#output ports per egress group) output queues and a cache slice implements a slice of each of these queues. An output queue is sliced over the cache slices. Banking enables the egress port group to receive tags at 16×2.4 GHz, for example.

Egress port group 430 can use scheduler 434 to receive queue occupancy information from the queue caches. Scheduler 434 can choose which queue slice to dequeue tags from. For a packet that is scheduled for egress, the packet data is fetched, partially accumulated, and streamed out the individual egress ports.

Figure 5A:
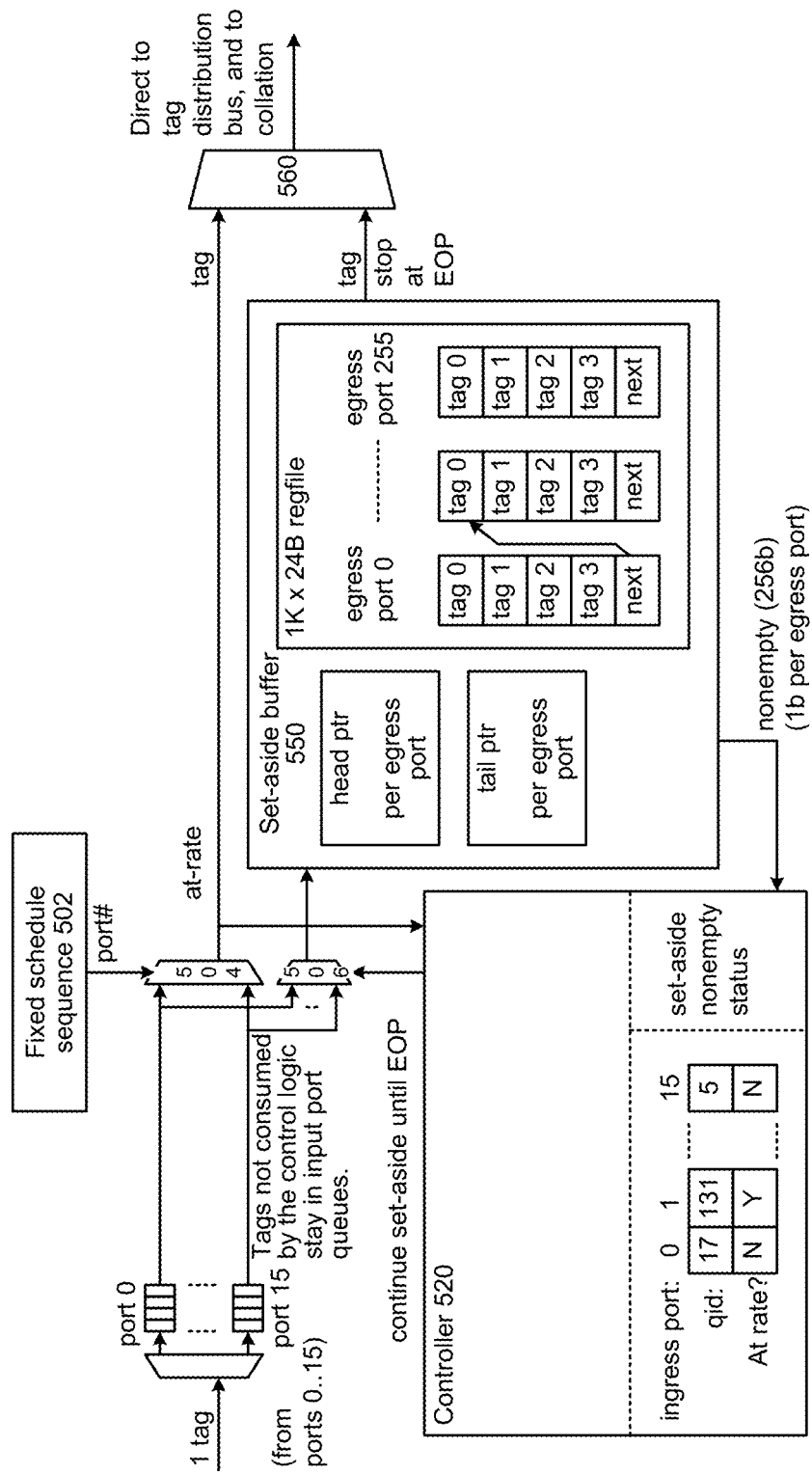
FIG. 5A depicts an example tag sequencer used by an ingress port group.

FIG. 5A depicts an example tag sequencer used by an ingress port group. When queues are sliced per ingress port group, not per individual port within that port group, tag sequencer attempts to avoid interleaving partial packets within a single queue slice. De-interleaving a packet can provide a packet in a contiguous manner in a queue slice. Tag sequencer can preserve cut-through behavior to provide a low latency path (e.g., at port speeds such as 10 Gbps) to allow a packet to egress if egress bandwidth is available even if the entire packet is not received at an ingress port or stored in memory.

Various embodiments can reduce a number and size of queues because a size of queues is (number of ingress port groups)\*(number of egress port)\*TC instead of (number of ingress ports)\*(number of egress ports)\*TC. For example, in a 256-port, 8-TC switch with 16 ports/group, this reduces from 512K to 32K queues). Various embodiments provide packets from N ingress ports into a single stream of contiguous TC. For example, for packets received on all N ingress ports, a full packet is streamed in sequence (no interleave) if there is no other packet that is being streamed to the same destination virtual queue (e.g., same QID). Various embodiments allow interleave of other packets going to different QIDs (e.g., virtual queue) based on available space between contiguous packets from different ingress ports. Using a single stream can avoid keeping track of ingress port, egress port, and traffic class to reassemble packets, which is memory intensive.

Packets can be stored in-order of receipt in an input port queue for ports 0 to 15. Input port queues enqueue tags processed from a packet processor (e.g., routing, look-up, access control lists). A round robin output from input port queues can be applied. For example, tags from input ports can be selected via a fixed schedule sequence (e.g., time wheel) or other schemes. For example, an X-lane port can receive X evenly-spaced slots out of 16 (for 16 input ports).

Packets not eligible for at-rate or set-aside yet are held in the input queues. The input port queues can be large enough to hold a complete jumbo packet, because they store partial packets which are de-interleaved by storage into a set aside buffer. Packets are moved one at a time from input queues to set-aside buffer (to avoid interleaving).

A fixed scheduler sequence 502 can be used to admit new tags. For example, the fixed scheduler 502 can be a fixed time wheel that admits new packets from input port queues into the rest of the tag sequencer structure (output from the right side multiplexers 504 and 506). The ingress queue time wheel does not skip ahead if there are no tags available for flow-through from the ingress queue selected on that cycle. This allows for tag bandwidth to be used for reading from set-aside queues, when there are no flow-through tags available from a given ingress port.

As an alternative to the input queues, set-aside buffer 550 could be designed to support a linked list per packet, resulting in a list of lists.

A tag sequencer can maintain flow (or TC) ordering. Tag sequencer can attempt to prevent blocking between different port pairs. The tag sequencer streams tags at-rate when possible. At-rate packets are eligible to cut-through the switch (though other conditions, such as port speed compatibility provide cut-through). Tag sequencer can use de-interleaved input queues (e.g., packets received from port0-port15) and a set-aside buffer.

At a start of a packet (SOP), controller 520 decides whether a tag is to go to set aside buffer or proceed at-rate. A same configuration is applied for the entire packet. If a tag is eligible for at-rate streaming, then that input queue is reserved for at-rate transfer of tags until the end of the packet is sent out. Tags not consumed by controller 520 stay in input port queues. Controller 520 inspects a packet's QID. A QID can be part of a "tag" and comes with the packet. QID can be (egress port+TC (or flow identifier)). For example, controller 520 lets a tag from an ingress port continue at-rate if tags from the ingress port with same QID already are progressing at-rate or both of the following are met: 1) there is no current tag progressing at-rate with the same QID and 2) current set-aside for the output port is empty (packets from the ingress port and QID are not being set aside). In other words, a tag proceed at rate if no other tag with the same QID already proceeds at rate (to avoid interleave) and none of the packet has been set aside. A tag can be sent at-rate from an input port queue if there is no other current packet in progress from input port queues or set-aside buffer to the same egress queue (for the no interleaving in queue slice requirement) and no packets are in a set-aside buffer to the same egress port (or to the same queue, if set-aside counters per queue are maintained) to give packets in the set-aside buffer a fair chance. At-rate packets support cut-through and can be dequeued before reaching end of packet (EOP).

If tags can be transmitted (cut through) at rate and not block other tags, then tags proceed at-rate and avoid the set aside buffer. Tags can be present in set-aside queues for a different egress port (for non-blocking).

Tag sequencer does not interleave another tag with a same QID as an at-rate tag from a different ingress port with the same QID and places the tag into a set aside buffer. If any tag is set aside for an ingress port and QID, tags continue to be set aside. After tags from an input port and QID finish commencing at-rate (EOP), an oldest tag with the same QID in the set aside buffer can be permitted to egress from the right side MUX.

Packets not sent at-rate from ingress queues are moved to set-aside queues in set-aside buffer 550. When a packet arrives that was routed to an egress queue that already has a currently streaming at-rate packet (i.e., unterminated), the new packet is placed into set-aside buffer 550. When a complete packet arrives in an input port queue, the tags of the complete packet can be written to set-aside buffer 550.

In some examples, 1 tag per cycle can be moved to set-aside buffer 550 (per 1.6 T), or even 1 tag only on cycles with no flow-through transmission from the ingress queues. Full packets (e.g., end of packet (EOP) is present in the ingress queue) can be moved to set-aside buffer 550 for non-blocking egress.

Tags in set-aside buffer 550 can be sent if there is no at-rate packet in progress from ingress queues to the same egress queue and egress port (for no interleaving). For egress from different egress ports, interleaving of some small number of packets from set-aside buffer 550 is permitted such as one set-aside packet is sent at a time, to minimize blocking of flow-through packets.

Set-aside buffer 550 can be a queue allocated to an output port. Set-aside buffer 550 can be implemented as multiple linked lists sharing a common memory, because the total size is bounded as explained below, and there is a case where a single queue can use the entire memory. In the example shown in FIG. 5A, there are 16 input ports, there is one set-aside buffer for ports 0 to 7 and another set-aside buffer for ports 8 to 15, to enable a total rate of 2 tags per clock. The set-aside buffer can support receipt of 1 or more tags per clock.

Set-aside buffer 550 can store a timer value for a tag or QID and ingress port pair to identify an age of a QID and ingress port pair. A QID and ingress port pair with an oldest can be selected to egress from the set-aside buffer.

Multiplexer (MUX) 560 forms a stream of tags received at-rate and from the set aside buffer. At-rate has highest priority and tags from the set aside will fill available slots in output stream. When any set-aside packets are available, the set-aside output may use all time slots on the tag distribution bus that are not occupied by at-rate tags. Set-aside tags are sent as fast as allowed by the available slots and the set-aside implementation. Interleaving of multiple set-aside queues can be allowed to reach full rate and this has no performance impact so long as any single set-aside queue can run at the maximum rate of a single port. Packets sent from set-aside queue can be marked for egress-side store-and-forward (SAF) operation, since the rate of sending set-aside tags cannot be guaranteed.

The total size of all set-aside queues depends on the ratio of the minimum tag rate at the minimum supported port speed, and the maximum tag rate for the maximum throughput on all the other lanes put together. For example, suppose 25 Gbps is the minimum port speed, and all the other 15 lanes can run at 100 Gbps. Then the buffers are to be large enough to hold max-rate packets arriving on the 15×100 Gbps ports, all destined to the same egress port, and blocked by one 10 KB packet being sent cut-through at 25 Gbps to that same egress port. A jumbo packet traversing at 25 Gbps takes ~3.2 us on the wire. At the maximum ingress rate of ~150 Mpps per 100 Gbps port, the remaining ports in the 1.6 Tbps ingress can generate 7500 tags during that time, so a total depth of about 8K tags in set-aside per 1.6 Tbps is required.

Figure 5B:
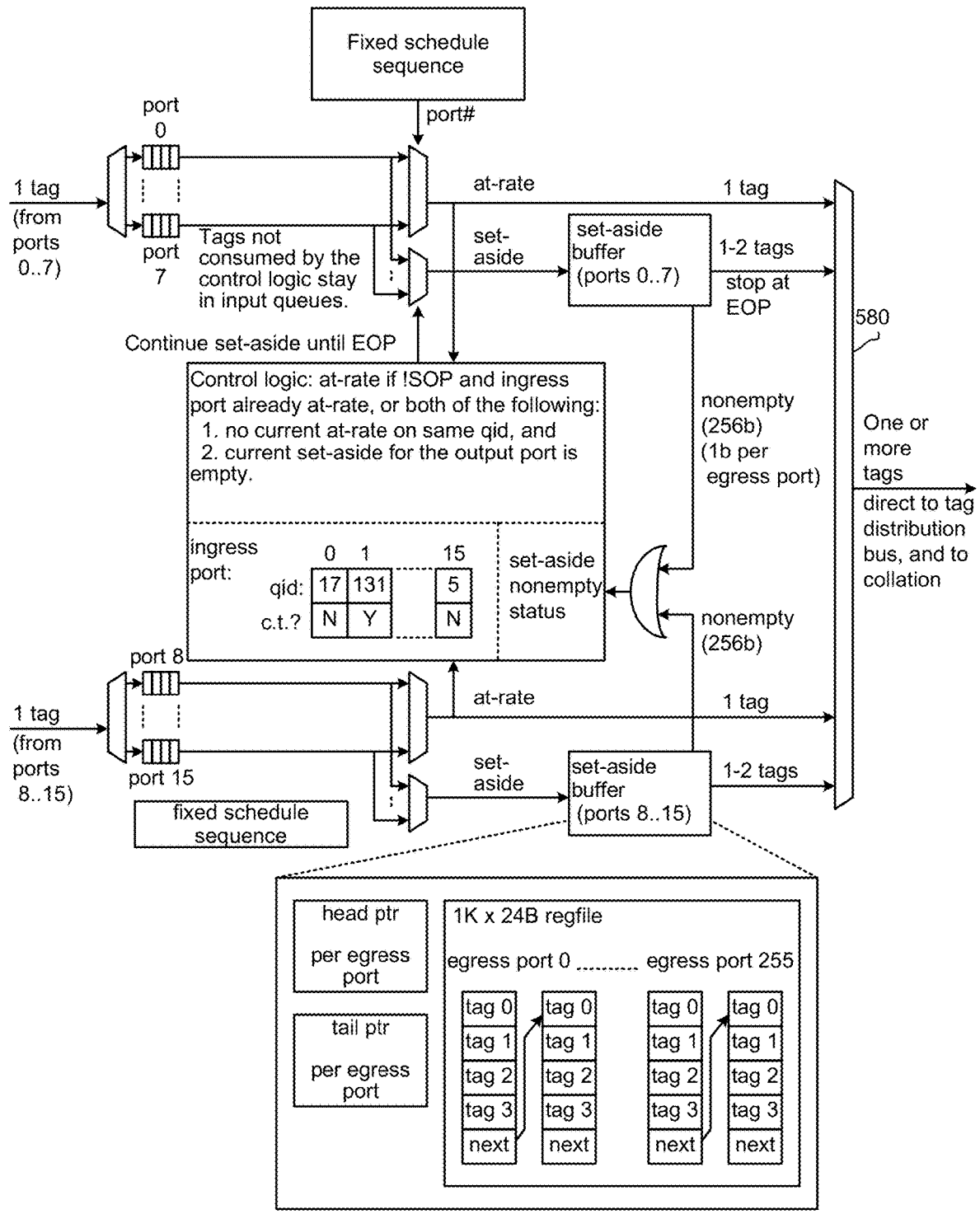
FIG. 5B shows an example tag sequencer.

FIG. 5B shows a tag sequencer handling 2 tags/clock in this example. Other numbers of tags/clock cycle are possible by splitting the set-aside buffer per smaller groups of ports. By running on a 2.4 GHz clock, tags are produced at a rate of 2.4 GHz (e.g., representing 1.6 Tbps worth of Ethernet ports). For example, input port queues for ports 0-7 and ports 8-15 can receive one tag per clock cycle. The output multiplexer 580 forms an output stream using tags sent at-rate or from a set-aside buffer.

Figure 5C:
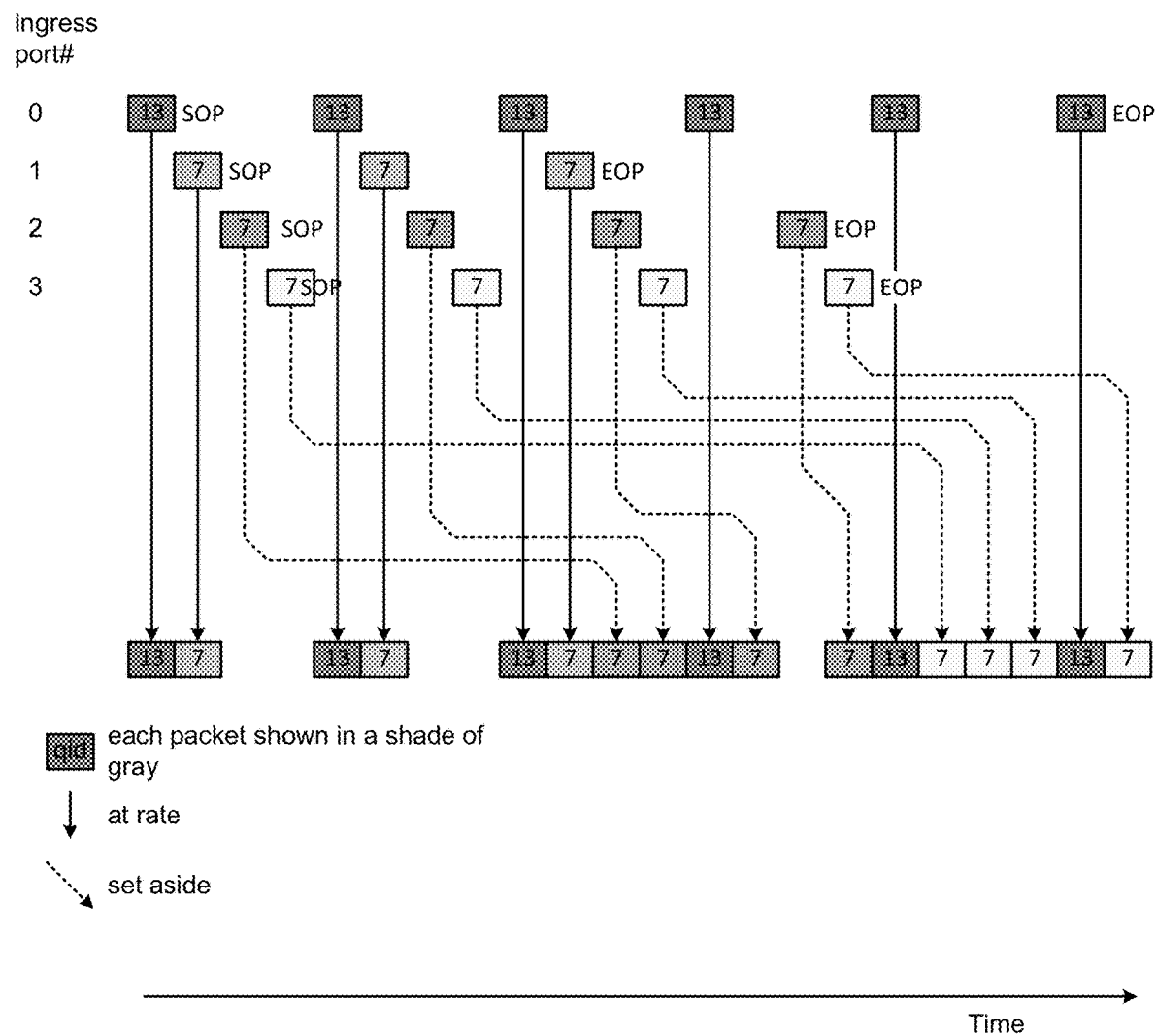
FIG. 5C shows an example tag sequence.

FIG. 5C shows an example of a tag sequence formed using tags at-rate and tags from the set-aside buffer. In this example, tags with QIDs 13 and 7 from respective ingress ports 0 and 1 are start of packet (SOP) and progress at-rate as there are no other tags with the same QID. Tags with QIDs 13 and 7 from respective ingress ports 0 and 1 proceed at rate and are given priority in the output stream. When a tag also with a QID of 7 that is an SOP but from ingress port 2 is received (after a tag with QID of 7 from ingress port 1), the tag is placed in set aside buffer because there is another tag with QID of 7 (from ingress port 1) that is output at rate and is after SOP. When a tag also with a QID of 7 that is an SOP but from ingress port 3 is received, the tag is placed in set aside buffer because there is another tag with QID of 7 that is output at rate and is after SOP. To prevent interleaving, tags with QID of 7 from ingress port 1 are output until complete (reaching end of packet (EOP)) before allowing any other tag with the same QID from a different ingress port to output. When there is space in the output stream and tags with QID of 7 have completed (end of packet (EOP)), tags with QID of 7 from ingress port 2 from SOP to EOP are allowed into the output stream. Tags with QID of 7 from ingress port 2 are permitted to proceed next because they are the oldest tags in the set-aside buffer.

To prevent interleaving, tags with QID of 7 from ingress port 3 wait until all tags with QID of 7 from ingress port 2 are output from the stream. Tags with QID of 7 from ingress port 2 started outputting first (because its SOP was received first) and therefore finish (output EOP) before the tags with QID of 7 from ingress port 3 can output (from SOP to EOP), to avoid interleaving tags within QID7 from ingress port 1 or 2. Note that tags with QID of 13 can be interleaved with tags of other QID, QID 7.

Figure 6A:
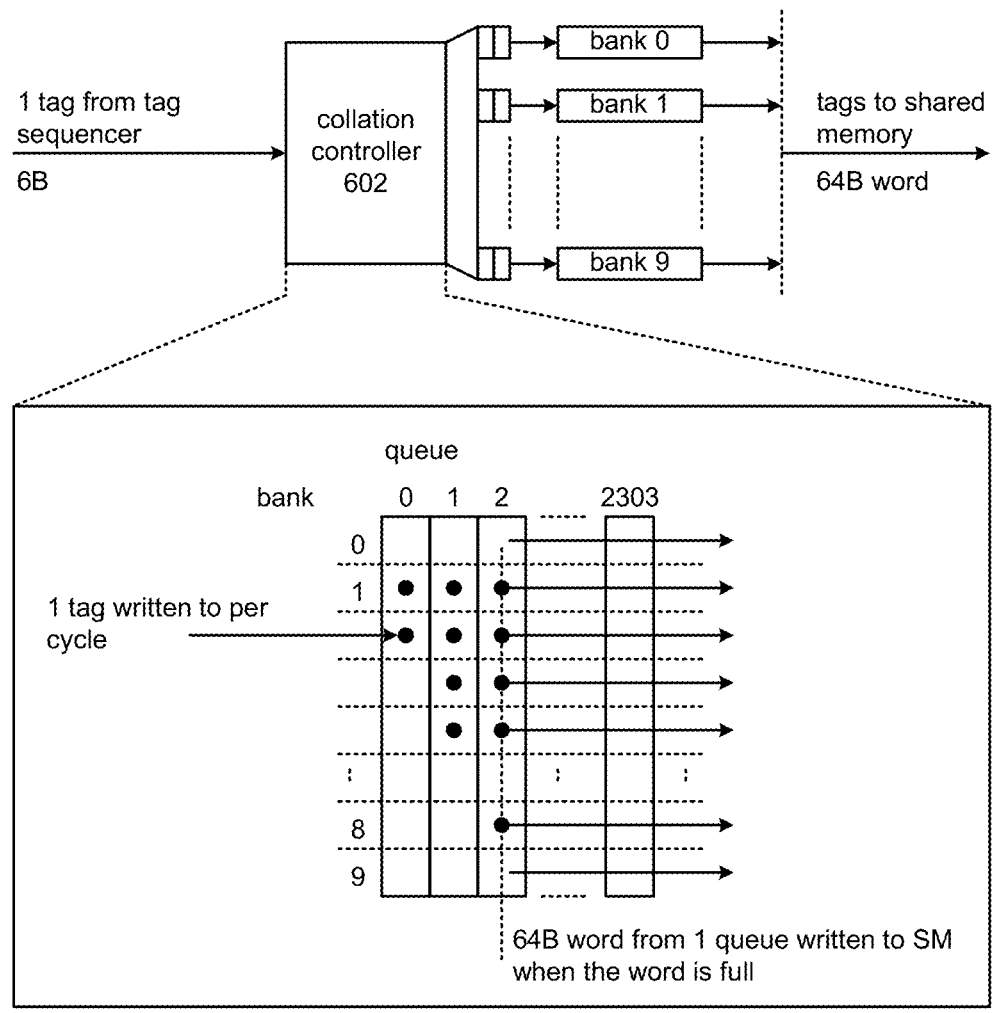
FIG. 6A depicts an example tag collator.

FIG. 6A depicts an example tag collator. Tag collator can be used to accumulate tags into words (or other sizes) for writing into shared memory. In some examples, when a tag is 6 bytes long, tag collator can pack ten 6 byte tags into a 64 byte word. The tag collator can act as the tail buffer structure for an ingress port group and hold a copy of the tail of each queue slice. In this example, tag collator that receives 1 tag each clock cycle from the tag sequencer. These tags may be for the same or different egress queues. In the example, these tags are written to a 10-bank buffer. When a queue has 10 tags, a complete 64 B word is written to the shared memory.

Figure 6B:
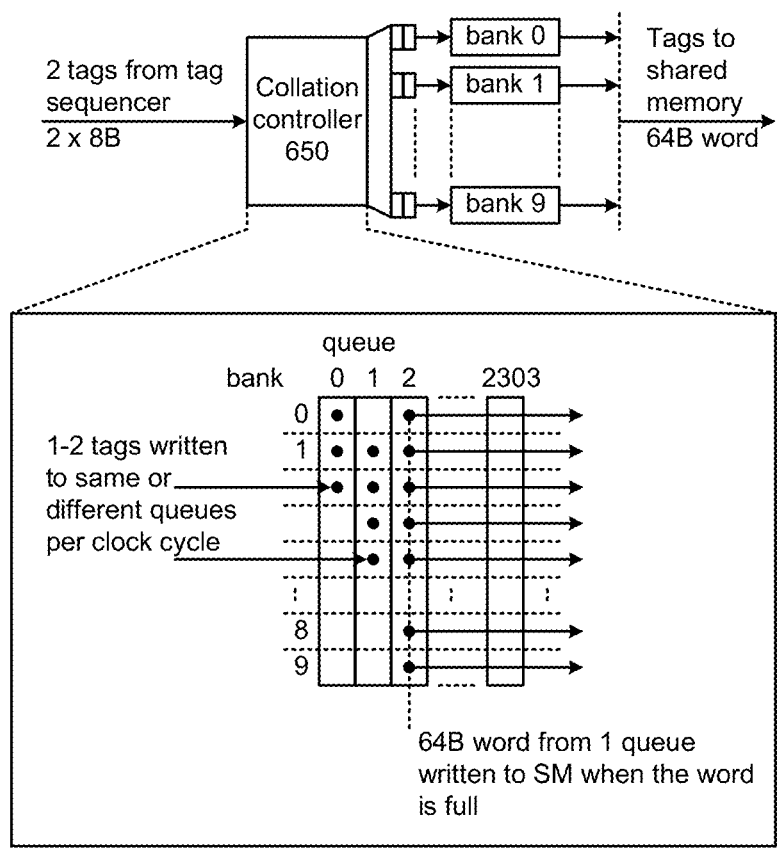
FIG. 6B depicts an example of a tag collator.

FIG. 6B depicts an example of a tag collator that receives 2 tags each clock cycle from the tag sequencer (other number of tags/clock cycle is possible).

A queue cache is used by an egress port group and includes one or more queue cache slices.

Figure 7A:
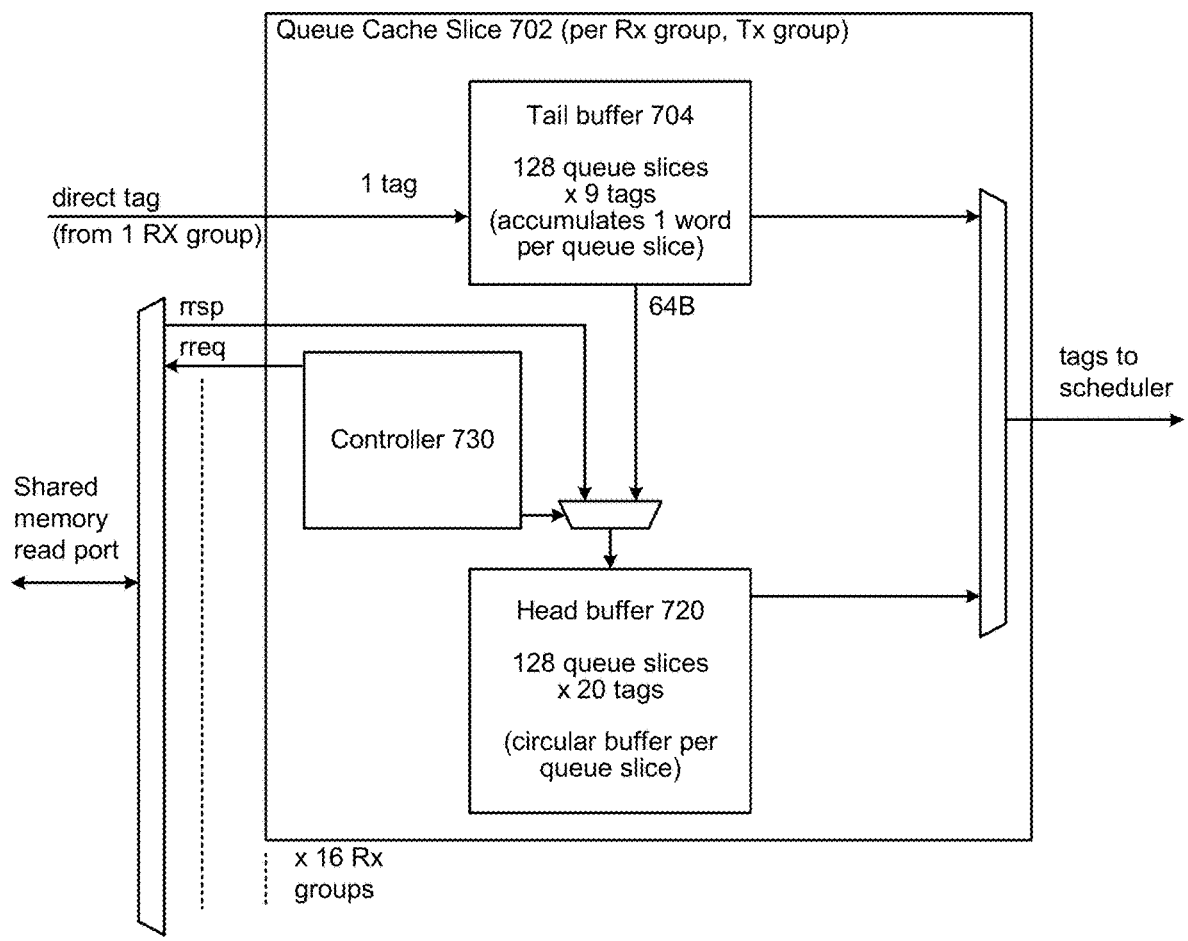
FIG. 7A depicts an example of a queue cache slice.

FIG. 7A depicts an example of a queue cache slice 702 used by an egress port group. A cache slice is associated with an egress port group. A cache slice receives tags from a single ingress port group via a tag distribution lane.

Tail buffer 704 receives tags. When tail buffer 704 is the head of the queue, individual tags can go directly out to a scheduler. In some examples, when a 64 B word is full, the word is copied to the head buffer 720 if it is the next word and space is available in head buffer 720. In some examples, where tags are collated at the egress side before written to shared memory, tail buffer 704 also receives the tags that are in the processed of being collated. For example, 10 tags can be collected (collated) before written to shared memory. Tail buffer 704 can store 9 of the tags if a QID and when the $10^{th}$ tag is received of the QID, the $10^{th}$ tag is joined with the 9 tags for transfer to head buffer 720 (if there is space in head buffer 720) without storing the $10^{th}$ tag in the tail buffer. If head buffer 720 is full, the 10 tags can be dropped from tail buffer 704 because they are also stored in shared memory. Separate tail and head buffers to allow writes and reads to be simultaneous.

When tag blocks are collated and written in 64 B words (i.e., 10 tags at a time), at most 9 tags are not written to shared memory at any given time. Tail buffer 704 can receive the 9 tags from an ingress port group. For example, an ingress port group can send 9 tags to each queue slice, where the 9 tags may not have been written (and may never be written) to the shared memory due to collation. These tags are not permitted to be discarded until the $10^{th}$ tag is received at least because egress cannot read from shared memory until $10^{th}$ tag is received.

Head buffer 720 holds oldest (beginning) tags of what is to transmit. In some examples head buffer 720 receives blocks of 10 tags from the tail buffer or reads blocks of 10 tags from the shared memory. Head buffer 720 is sized to cover the worst possible shared memory latency. Head buffer 720 is responsible for deallocating tag blocks from the deep queues in shared memory. Head buffer 720 uses at least (memory latency)*(port data rate) bits, so that transmission can proceed without gaps when a queue is selected and the queue does not fit in head buffer 720. For example, suppose the memory latency is 100 ns. A queue containing more than 100 ns of data can be selected. When this selection occurs, a memory read is launched, but the shared memory will not return data for 100 ns. During this 100 ns, tags associated with data are sourced from the head buffer.

If tags are read in words, then head buffer 720 can additionally contain an extra word, to avoid requesting a word from memory that cannot be completely stored. Head buffer 720 may also need to be larger if blocks are linked in larger units than the word.

Controller 730 generates a next fetch request when a tag is available in shared memory but not in head or tail buffer and space is available in head buffer.

Figure 7B:
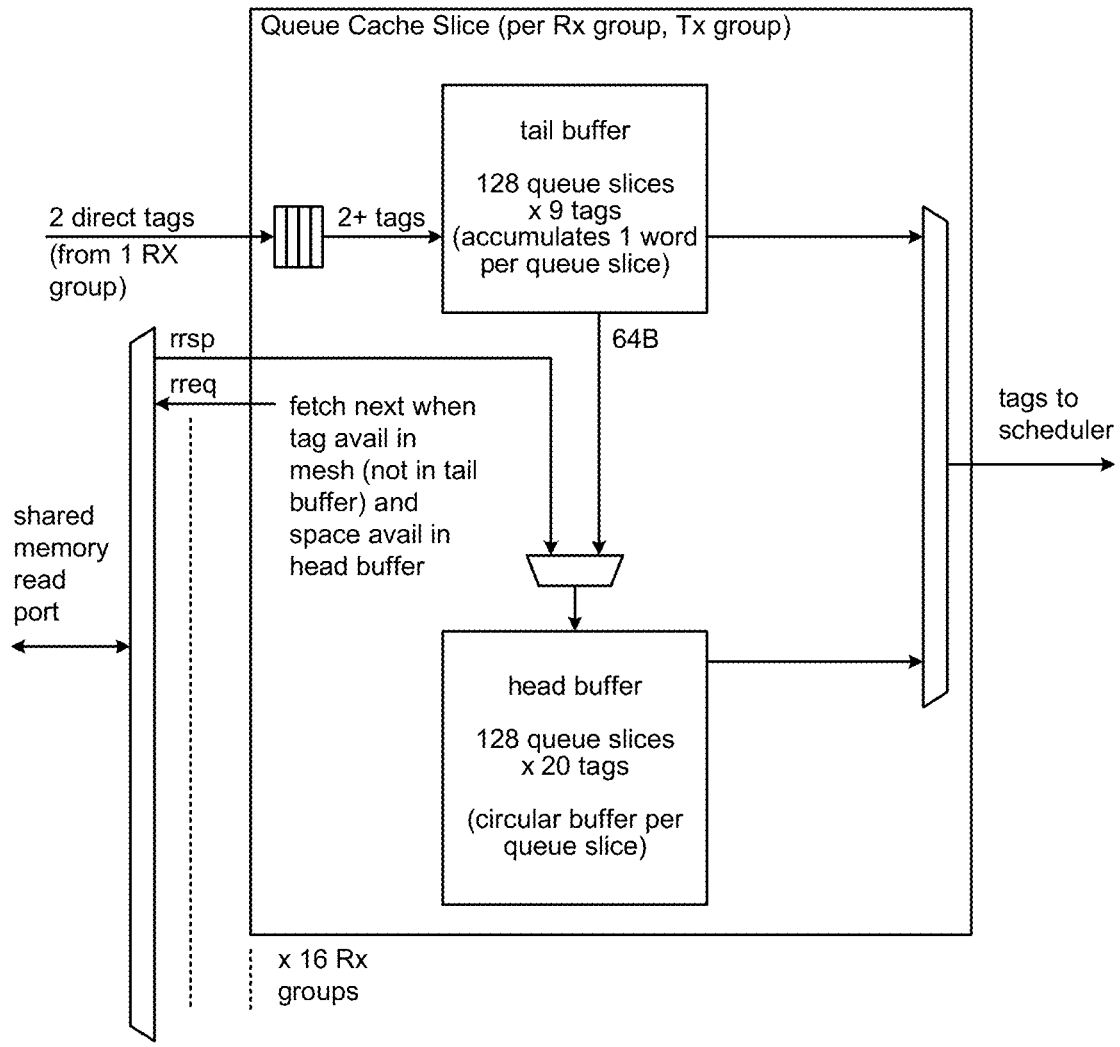
FIG. 7B depicts an example queue cache slice for 2 tags per receive group.

FIG. 7B depicts an example queue cache slice for 2 tags per receive group.

Figure 8A:
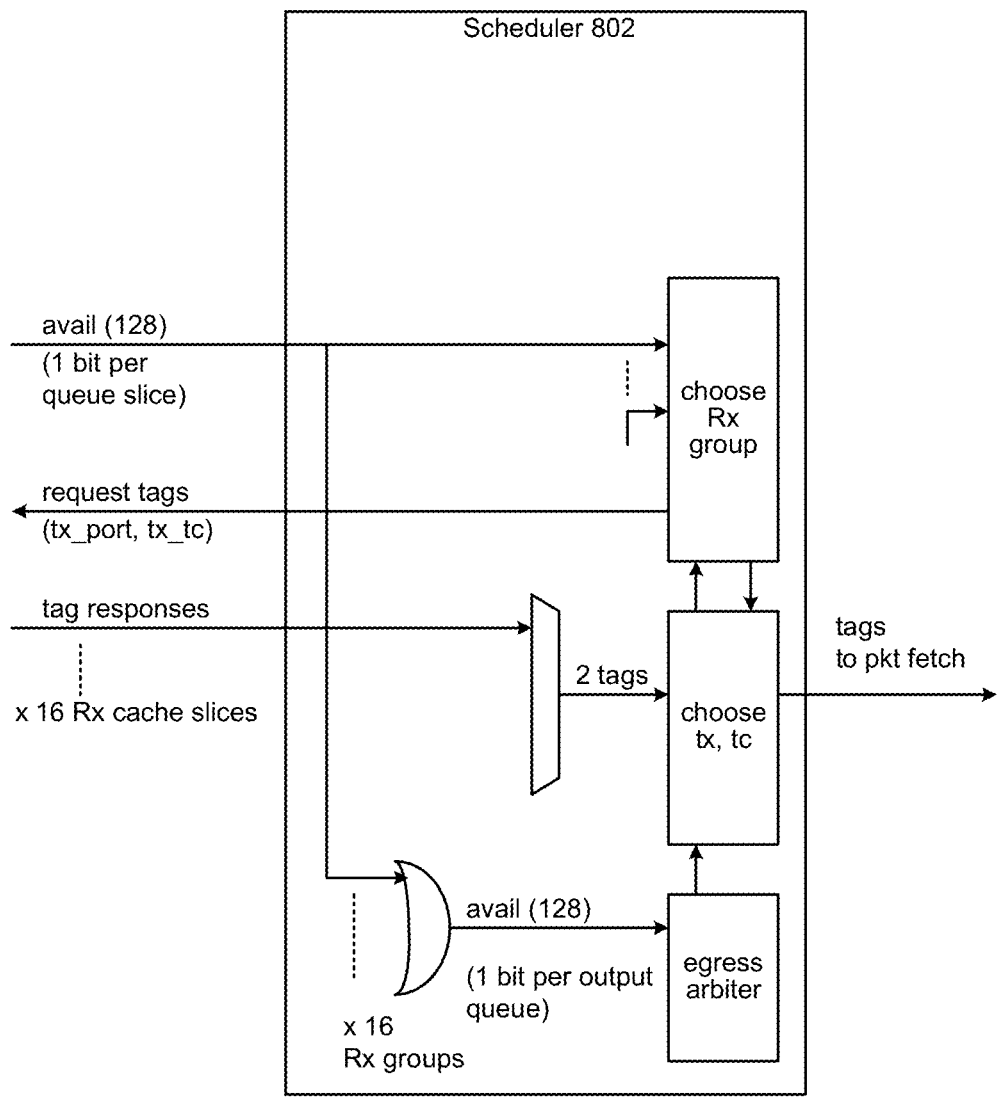
FIG. 8A depicts an example scheduler for use by an egress port group.

FIG. 8A depicts an example scheduler for use by an egress port group. Scheduler 802 receives queue occupancy information from the queue caches and chooses which queue slices to dequeue tags from. Slices can be recombined in order packet arrives using time stamp mechanism described in TIMESTAMP-BASED FAIRNESS EGRESS FROM INGRESS QUEUES, application Ser. No. 16/547,482, filed Aug. 21, 2019 (AB9342-US). As an alternative to representing availability as a bit per queue slice, this could be communicated from the queue cache as counter deltas (N when N tags are enqueued). A tag is transferred per clock cycle. Tags can be allocated for egress by choosing a tag with the oldest timestamp. In some examples, scheduler 802 can read from all cache slices associated with egress ports.

Figure 8B:
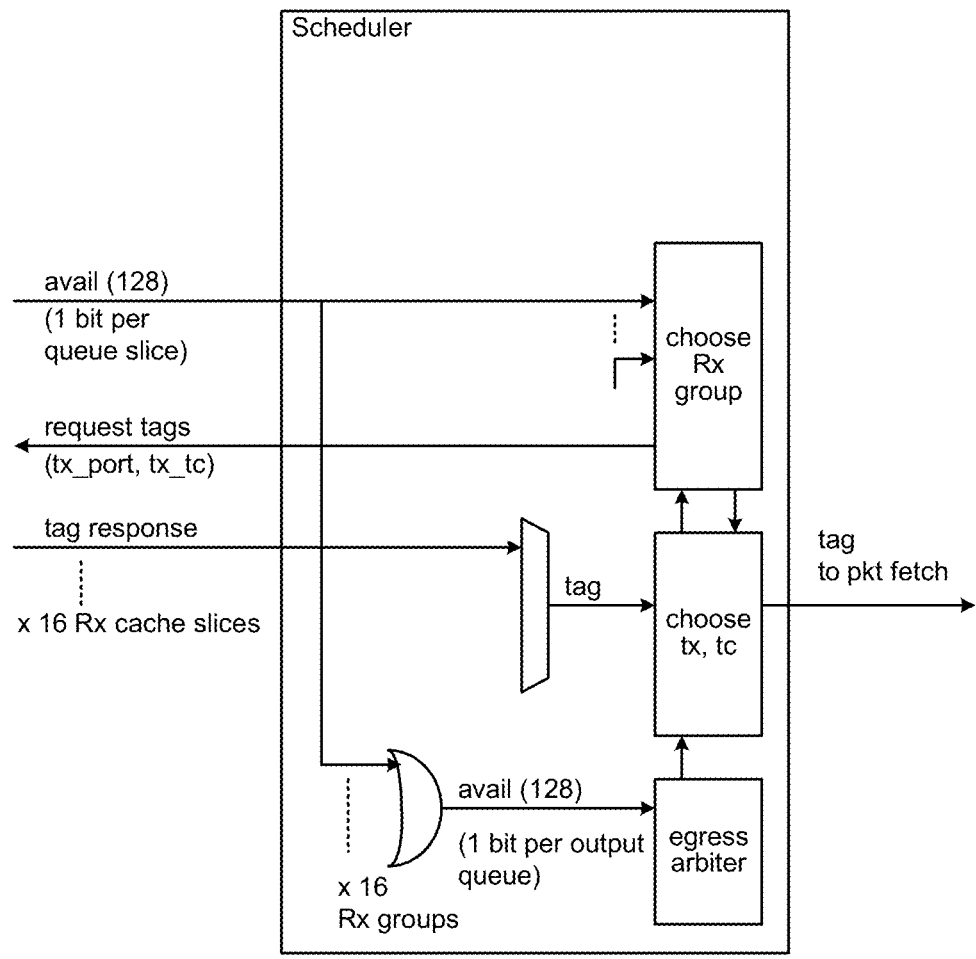
FIG. 8B depicts an example where 2 tags are transferred per clock cycle.

FIG. 8B depicts an example where 2 tags are transferred per clock cycle.

After a scheduler has selected a tag for egress, the associated packet data can be retrieved or copied from shared memory. The retrieved or copied packet data can be accumulated or egressed from an associated egress port.

Processing of packets can take place prior to egress. An egress port group can apply access control list (ACL) to determine which packets to drop and not egress.

At egress, packets can be provided in an Ethernet frame, or communications compatible with RDMA, InfiniBand, Internet Wide Area RDMA Protocol (iWARP), quick UDP Internet Connections (QUIC), or RDMA over Converged Ethernet (RoCE). Data and logs can be stored to virtualized storage nodes using a protocol such as NVMe over Fabrics (NVMe-oF). A network, fabric, interconnect, bus, or medium that is to receive a packet can be compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, 3GPP Long Term Evolution (LTE) (4G), 3GPP 5G, and variations thereof.

Figure 9A:
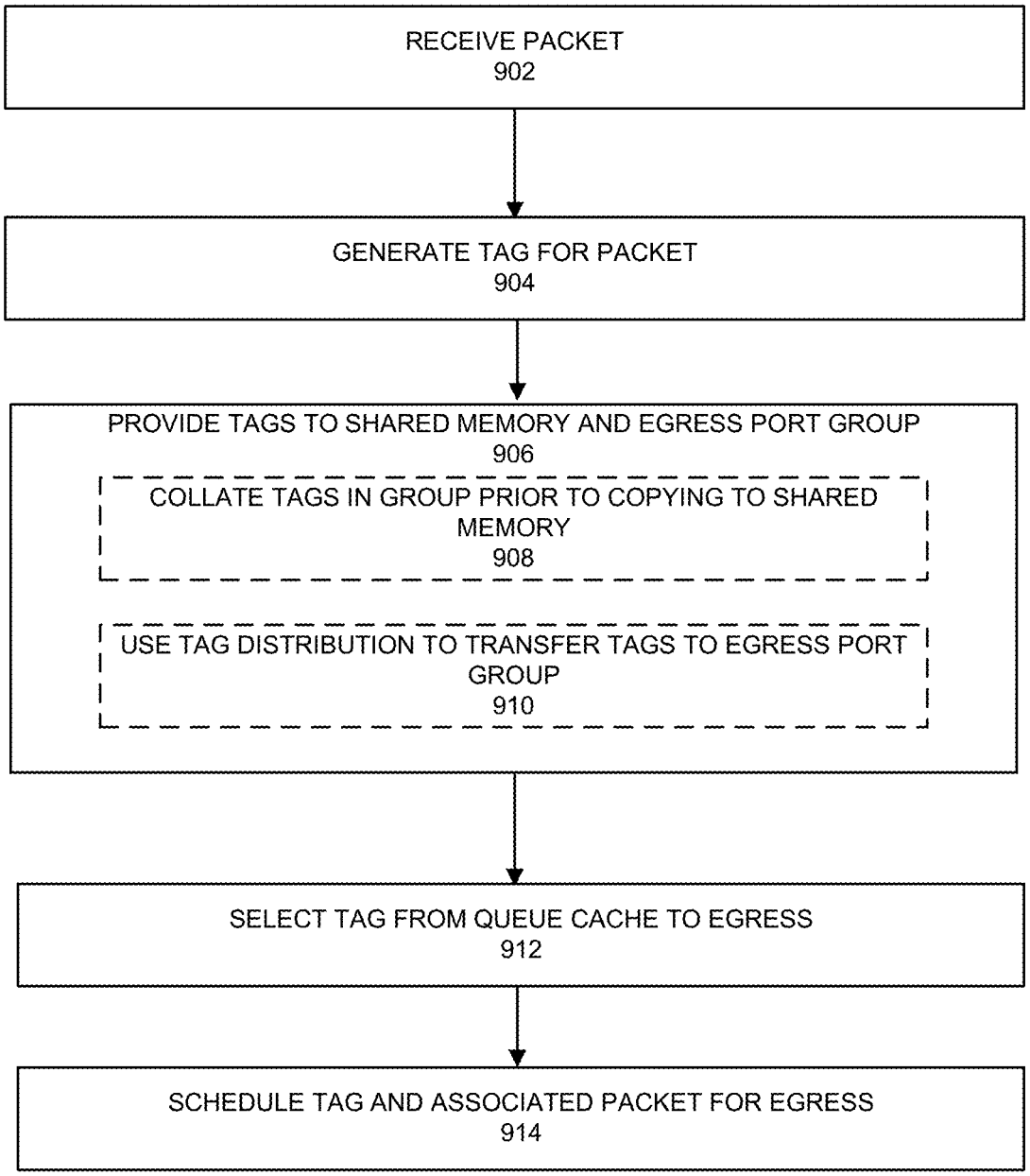
FIG. 9A depicts a process.

FIG. 9A depicts a process. The process can be performed by a switch or network interface. At 902, a packet is received. At 904, a tag is generated for the received packet. A tag can include a QID, egress port, TC (or flow identifier), and identifier of location in memory that stores a portion of a packet. At 906, tags can be provided to shared memory and a relevant egress port group. For example, 906 can include one or more of 908 and 910.

At 908, tags are collated before transfer to shared memory. Collating tags can include packing up tags before transfer to shared memory to reduce a number of write transactions. When a tag is 6 bytes and a word is 64 bytes, 10 tags are collated before being written to shared memory as part of a 64 B word. Collating tags can reduce a number of writes to memory.

At 910, tags are transferred to a cache queue associated with an egress port group. A tag delivery path can be used to provide a lower latency path to transfer a tag than that of the memory. The tag delivery path can use independent bus lanes for any ingress port group and use a queue associated with an egress port to receive tags. In some examples, transferring tags to the queue can use a sequencing scheme. A sequencing scheme can be used to prevent interleave of tags destined to a same virtual output queue. A tag can be permitted to be sent to the queue from start of packet (SOP) to end of packet (EOP) without interleaving with any other tag associated with the same QID. However, tags from other QID can be interleaved in available slots. After the transfer of the tag associated with the EOP, a next received tag associated with a SOP with the same QID but a different ingress port can be permitted to be sent to the queue slice.

At 912, for an egress port group, a tag for egress from a queue cache is selected for egress of a related packet segment. The tag can be selected as the oldest tag based on a time stamp associated with the tag. If the tag is available from a head or tail buffer of the queue cache slice, the tag is used to identify a packet segment of a packet stored in shared memory. If the tag is not available in the queue cache slice, then the tag can be accessed from shared memory and the associated packet segment retrieved from shared memory.

At 914, a tag can be scheduled for packet can be egressed from an egress port. The packet data associated with the scheduled tag can be retrieved from shared memory.

Figure 9B:
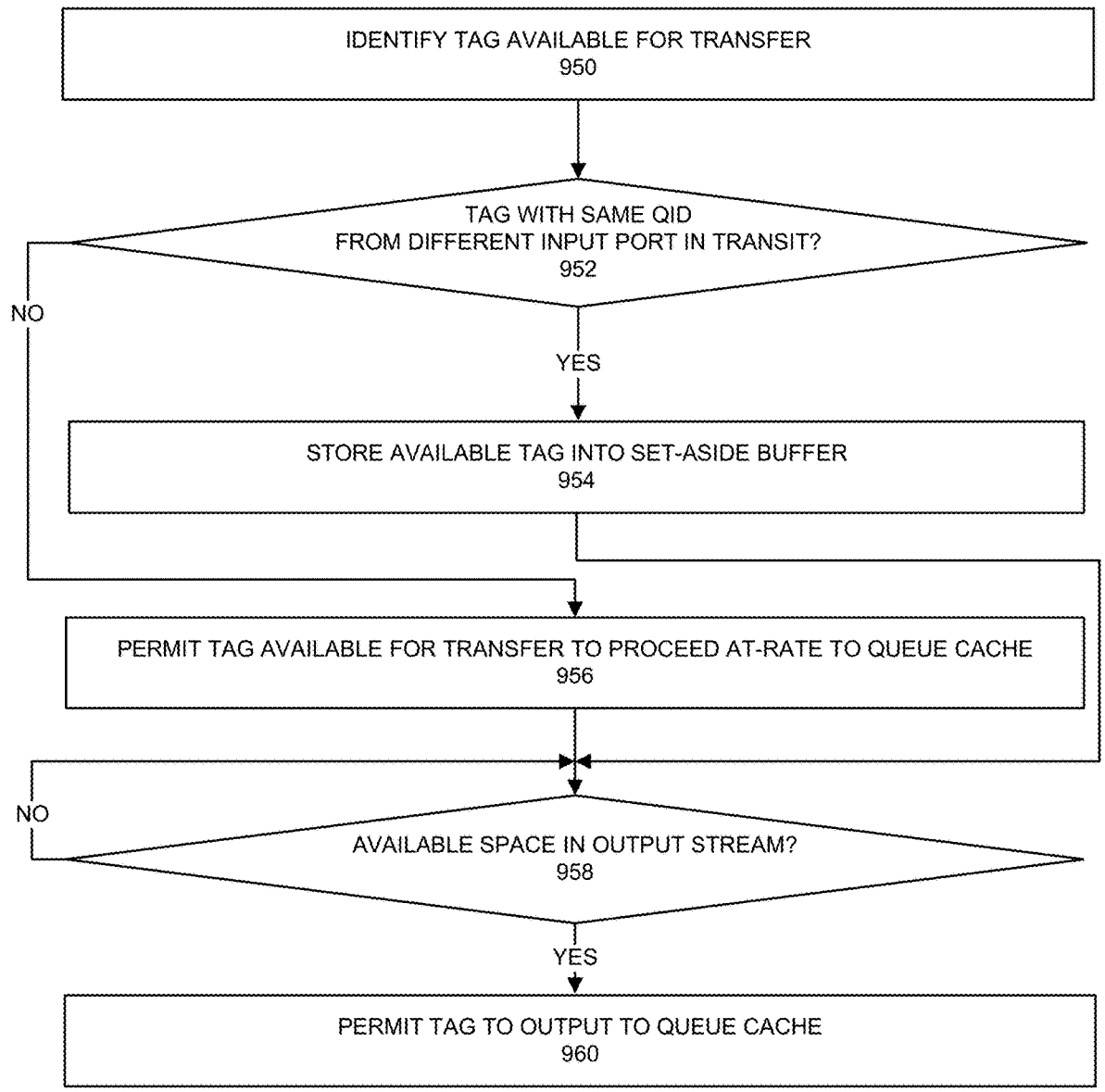
FIG. 9B depicts a process for tag deinterleaving.

FIG. 9B depicts a process for tag deinterleaving. The process can be performed by a switch or network interface. At 950, a tag is identified as available for transfer to a queue cache slice associated with an egress port group. The tag has an associated QID. The tag can be associated with an input port queue for an input port of an input port group. At 952, a determination is made if a tag with the same QID from a different input port is in transit. If a tag is in transit with the same QID from a different input port, the process continues to 954. If a tag is not in transit with the same QID from a different input port or no tag is in transit, the process continues to 956.

At 954, the available tag is stored in the set-aside buffer and the process proceeds to 958. At 956, the tag available for transfer is permitted to proceed at-rate to the queue cache slice and the process proceeds to 958.

At 958, a determination is made as to whether there is space in the output stream for a tag. For example, space can be made available after an end of packet for a QID to transfer a tag associated with the same QID but from a different ingress port. For example, space can be made available for a different QID. If there is space in the output stream for a tag, the process continues to 960. If there is no space in the output stream for a tag, 958 repeats.

At 960, a tag is permitted to be output to the queue cache. For example, the tag associated with a start of packet and in the set aside buffer is permitted to be sent to the queue cache slice. A tag distribution bus can be used to transfer the tag.

Figure 10:
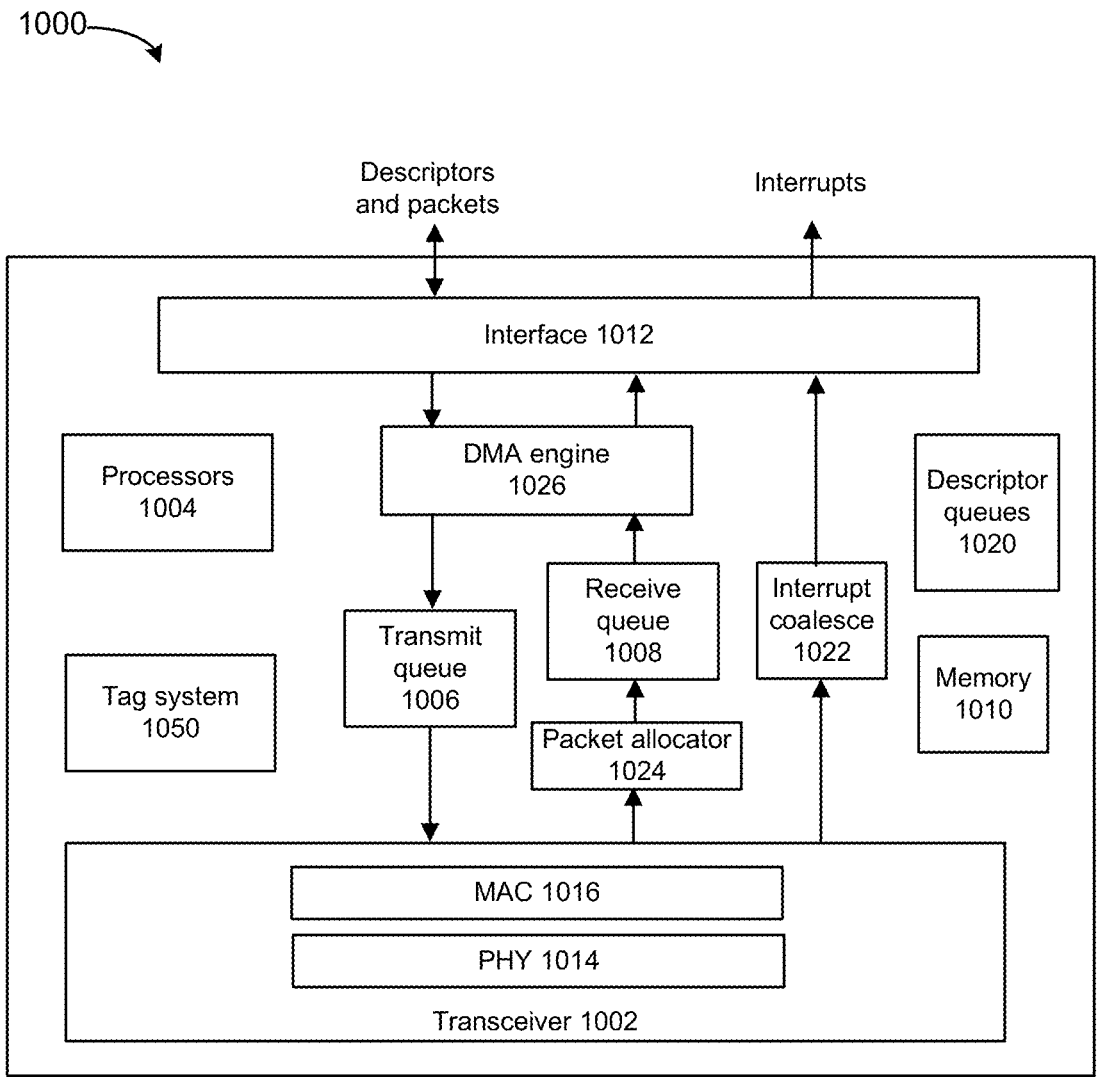
FIG. 10 depicts a network interface.

FIG. 10 depicts a network interface that can use embodiments or be used by embodiments. For example, packets can be transmitted from network interface using embodiments described herein to provide tags and packets. Network interface 1000 can include transceiver 1002, processors 1004, transmit queue 1006, receive queue 1008, memory 1010, and bus interface 1012, and DMA engine 1026. Transceiver 1002 can be capable of receiving and transmitting packets in conformance with the applicable protocols such as Ethernet as described in IEEE 802.3, although other protocols may be used. Transceiver 1002 can receive and transmit packets from and to a network via a network medium (not depicted). Transceiver 1002 can include physical layer (PHY) circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to assemble data to be transmitted into packets, that include destination and source addresses along with network control information and error detection hash values. MAC circuitry 1016 can be configured to process MAC headers of received packets by verifying data integrity, removing preambles and padding, and providing packet content for processing by higher layers.

Processors 1004 can be any a combination of a: processor, core, graphics processing unit (GPU), field programmable gate array (FPGA), application specific integrated circuit (ASIC), or other programmable hardware device that allow programming of network interface 1000. For example, processors 1004 can provide for allocation or deallocation of intermediate queues. For example, a "smart network interface" can provide packet processing capabilities in the network interface using processors 1004.

Packet allocator 1024 can provide distribution of received packets for processing by multiple CPUs or cores using timeslot allocation described herein or RSS. When packet allocator 1024 uses RSS, packet allocator 1024 can calculate a hash or make another determination based on contents of a received packet to determine which CPU or core is to process a packet.

Interrupt coalesce 1022 can perform interrupt moderation whereby network interface interrupt coalesce 1022 waits for multiple packets to arrive, or for a time-out to expire, before generating an interrupt to host system to process received packet(s). Receive Segment Coalescing (RSC) can be performed by network interface 1000 whereby portions of incoming packets are combined into segments of a packet. Network interface 1000 provides this coalesced packet to an application.

Direct memory access (DMA) engine 1026 can copy a packet header, packet payload, and/or descriptor directly from host memory to the network interface or vice versa, instead of copying the packet to an intermediate buffer at the host and then using another copy operation from the intermediate buffer to the destination buffer.

Memory 1010 can be any type of volatile or non-volatile memory device and can store any queue or instructions used to program network interface 1000. Transmit queue 1006 can include data or references to data for transmission by network interface. Receive queue 1008 can include data or references to data that was received by network interface from a network. Descriptor queues 1020 can include descriptors that reference data or packets in transmit queue 1006 or receive queue 1008. Bus interface 1012 can provide an interface with host device (not depicted). For example, bus interface 1012 can be compatible with peripheral connect Peripheral Component Interconnect (PCI), PCI Express, PCI-x, Serial ATA (SATA), and/or Universal Serial Bus (USB) compatible interface (although other interconnection standards may be used).

Memory 1010 can include shared memory used to aggregate packet segments and tags.

Tag system 1050 can apply embodiments described herein to manage handling of ingress or egress packets.

Figure 11:
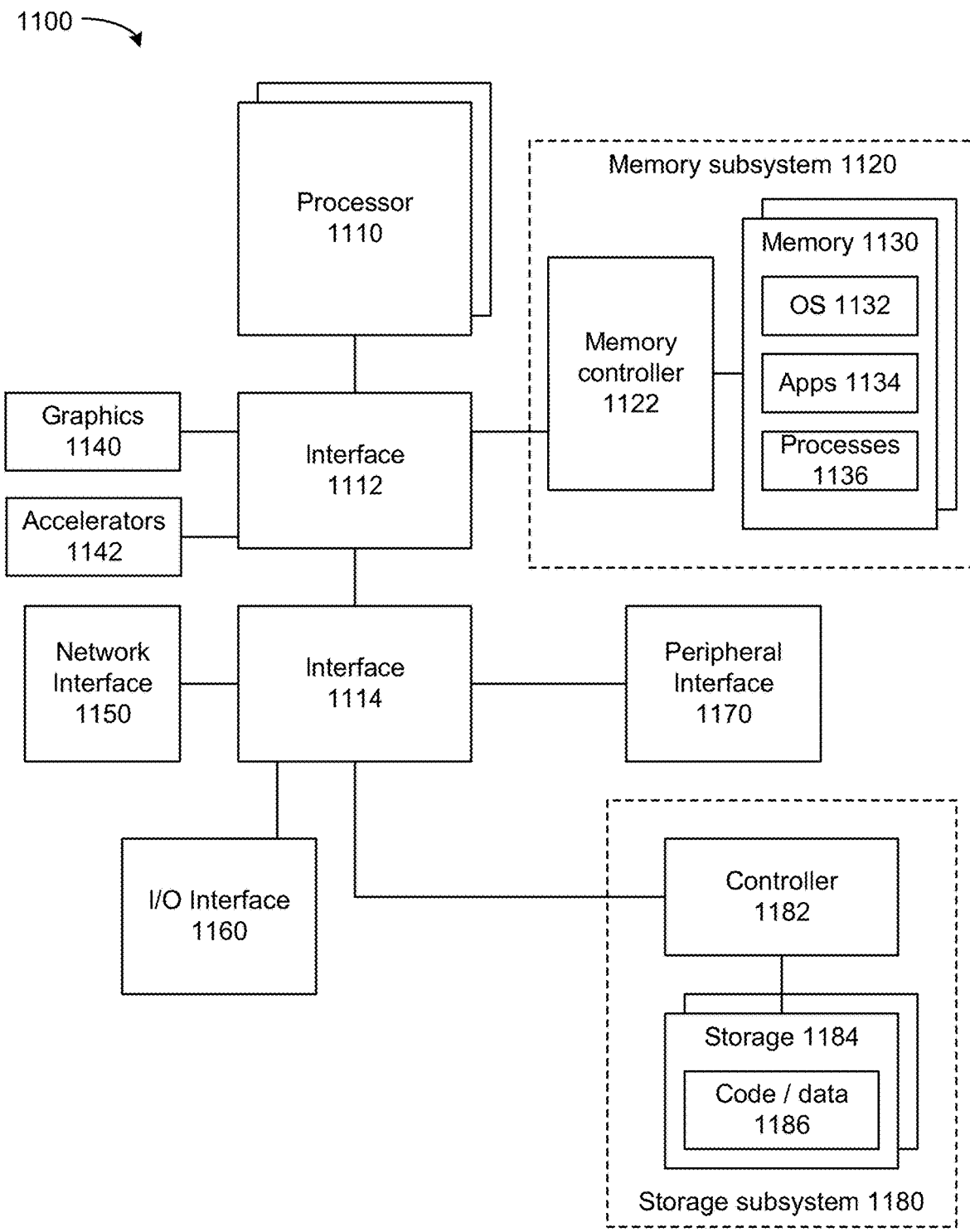
FIG. 11 depicts a system.

FIG. 11 depicts a system. The system can use embodiments described herein to provide data to or from the system to another device through a mesh or fabric. System 1100 includes processor 1110, which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1100 includes interface 1112 coupled to processor 1110, which can represent a higher speed interface or a high throughput interface for system components that needs higher bandwidth connections, such as memory subsystem 1120 or graphics interface components 1140, or accelerators 1142. Interface 1112 represents an interface circuit, which can be a standalone component or integrated onto a processor die. Where present, graphics interface 440 interfaces to graphics components for providing a visual display to a user of system 1100. In one example, graphics interface 1140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Accelerators 1142 can be a fixed function offload engine that can be accessed or used by a processor 1110. For example, an accelerator among accelerators 1142 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1142 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory. Network interface 1150 can receive data from a remote device, which can include storing received data into memory. Various embodiments can be used in connection with network interface 1150, processor 1110, and memory subsystem 1120.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1146 in a persistent state (i.e., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (i.e., the value or state of the data is indeterminate if power is interrupted to system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1100. More specifically, power source typically interfaces to one or multiple power supplies in system 1100 to provide power to the components of system 1100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1100 can be implemented using interconnected compute sleds of processors, memories, storages, network interfaces, and other components. High speed interconnects can be used such as PCIe, Ethernet, or optical interconnects (or a combination thereof) or any connection protocol referenced herein.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Figure 12:
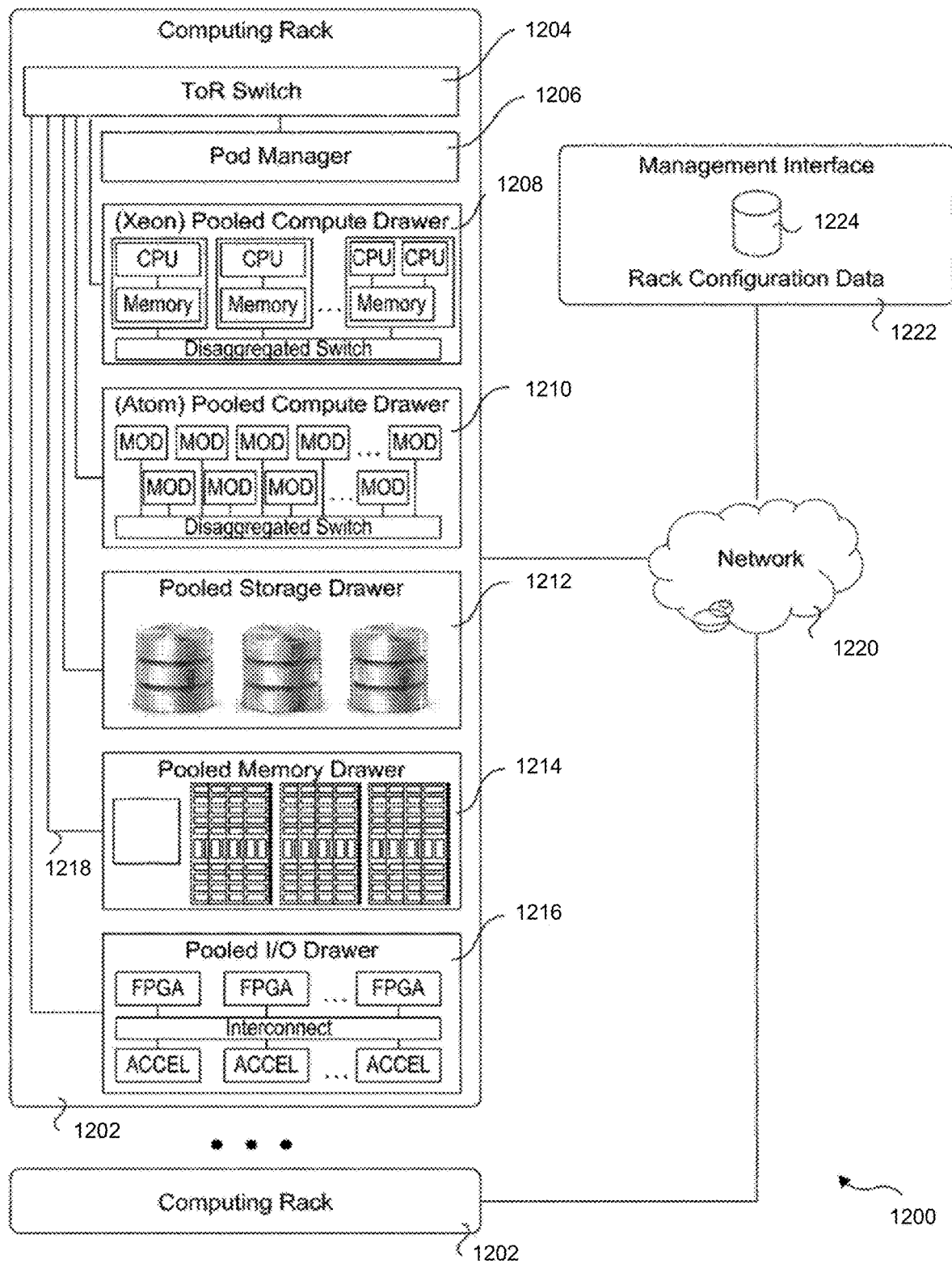
FIG. 12 depicts an environment.

FIG. 12 depicts an environment 1200 includes multiple computing racks 1202, some including a Top of Rack (ToR) switch 1204, a pod manager 1206, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1208, and Intel® ATOM™ pooled compute drawer 1210, a pooled storage drawer 1212, a pooled memory drawer 1214, and a pooled I/O drawer 1216. Some of the pooled system drawers is connected to ToR switch 1204 via a high-speed link 1218, such as a 40 Gigabit/second (Gb/s) or 100 Gb/s Ethernet link or a 100+ Gb/s Silicon Photonics (SiPh) optical link. In one embodiment high-speed link 1218 comprises an 800 Gb/s SiPh optical link.

Multiple of the computing racks 1202 may be interconnected via their ToR switches 1204 (e.g., to a pod-level switch or data center switch), as illustrated by connections to a network 1220. In some embodiments, groups of computing racks 1202 are managed as separate pods via pod manager(s) 1206. In one embodiment, a single pod manager is used to manage racks in the pod. Alternatively, distributed pod managers may be used for pod management operations.

Environment 1200 further includes a management interface 1222 that is used to manage various aspects of the environment. This includes managing rack configuration, with corresponding parameters stored as rack configuration data 1224.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives.

These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus that includes: a memory; a tag delivery path; a tag buffer to receive a tag from the tag delivery path; and an egress scheduler, the egress scheduler to: determine a packet to egress using an available tag from one of: the memory and the tag buffer.

Example 2 includes any example, wherein: the tag is to identify a location of a portion of the packet in the memory and the egress scheduler is to access the tag, wherein to access the tag, the egress scheduler is to attempt to access the tag from the tag buffer or if the tag is absent from the tag buffer, attempt to access the tag from the memory.

Example 3 includes any example, wherein: the tag buffer is allocated in the memory and the tag buffer is to store a number of tags but not store a tag if the tag buffer is full.

Example 4 includes any example, wherein: the tag buffer is allocated in the memory, the tag buffer is to store a number of tags to have an available tag to attempt to achieve a packet egress rate whether a tag is retrieved from the tag buffer or the memory, and the tag buffer is to store tags in a packet egress order.

Example 5 includes any example, wherein: the tag delivery path is to provide a lower latency tag access than that of the memory, the tag delivery path is to use independent bus lanes for an ingress port group, and the tag buffer is associated with an egress port.

Example 6 includes any example, and includes a router associated with an ingress port, wherein the router is to collate tags and write blocks of tags to the memory to reduce shared-memory transactions.

Example 7 includes any example, wherein the tag buffer comprises a tail buffer and a head buffer.

Example 8 includes any example, wherein the tag buffer comprises a queue cache slice allocated per egress port group.

Example 9 includes any example, wherein the memory is to permit a single queue to use an entirety of the memory to store tags and packet data from one or more ingress ports.

Example 10 includes any example, and includes an ingress port group and a tag sequencer to maintain packets as non-interleaved for an ingress port to reduce underrun and provide cut-through.

Example 11 includes any example, wherein the tag sequencer is to prevent packets that are store-and-forward from blocking cut-through packets.

Example 12 includes any example, and includes one or more of: a network interface, switch, data center, server, rack, or blade.

Example 13 includes any example, and includes a server, wherein the server is to process packets prior to egress and perform one or more of: software defined networking (SDN) or network functions virtualization (NFV).

Example 14 includes a method that includes: associating a tag with a packet; storing tags as a group into a memory; and using a tag delivery path to provide a tag to a buffer associated with an egress port, wherein the tag delivery path is to provide lower latency tag access to the egress port than that of the memory.

Example 15 includes any example, and includes: maintaining packets received at an ingress port as non-interleaved to reduce underrun and provide cut-through to an egress port.

Example 16 includes any example, and includes scheduling egress of a packet from an egress port by access of its tag, wherein: if the tag is in the buffer associated with the egress port, reading the tag from the buffer and if the tag is not stored in the buffer, reading the tag from the memory.

Example 17 includes any example, and includes: storing a number of tags in the buffer to attempt to have an available tag to achieve a packet egress rate from an egress port whether a tag is retrieved from the buffer or the memory and storing tags in the buffer in a packet egress order.

Example 18 includes any example, and includes permitting a tag queue to use an entire memory, wherein the tag queue stores tags and packet data from one or more ingress ports.

Example 19 includes any example, wherein storing tags as a group into a memory comprises collating a threshold number of tags and storing the threshold number of tags into the memory.

Example 20 includes any example, and includes storing a received packet in the memory and performing packet processing on a packet stored in the memory.

Example 21 includes a system that includes a memory and a switch that includes at least one ingress port; at least one egress port; a tag delivery path; and at least one processor to: associate a tag with a packet; store tags as a group into the memory; and use the tag delivery path to provide a tag to a buffer associated with an egress port, wherein the tag delivery path is to provide lower latency tag access to the egress port than that of the memory.

Example 22 includes any example, and includes an egress scheduler and wherein: the tag is to identify a location of a portion of the packet in the memory and the egress scheduler is to access a tag, wherein to access the tag, the egress scheduler is to attempt to access the tag from the buffer or if the tag is absent from the tag buffer, attempt to access the tag from the memory.

What is claimed is:

1. An apparatus comprising:
a memory;
circuitry to provide a path for tag delivery;
a buffer to receive a tag from the circuitry to provide a path for tag delivery; and
second circuitry to:
  determine a packet to egress using an available tag from one of: the memory or the buffer, wherein:
    the circuitry is to provide a lower latency tag access than that of the memory,
    the circuitry to provide tag delivery independent of access to the memory, and
    the buffer is associated with an egress port.

2. The apparatus of claim 1, wherein:
the tag is to identify a location of a portion of the packet in the memory and
the second circuitry is to access the tag, wherein to access the tag, the second circuitry is to attempt to access the tag from the buffer and if the tag is absent from the buffer, attempt to access the tag from the memory.

3. The apparatus of claim 1, wherein:
the buffer is allocated in the memory and
the buffer is to store a number of tags but not store the tag if the buffer is full.

4. The apparatus of claim 1, wherein:
the buffer is allocated in the memory,
the buffer is to store a number of tags to have an available tag to attempt to achieve a packet egress rate whether a tag is retrieved from the buffer or the memory, and
the buffer is to store tags in a packet egress order.

5. The apparatus of claim 1, comprising a third circuitry associated with an ingress port, wherein the third circuitry is to collate tags and write blocks of tags to the memory to reduce shared-memory transactions.

6. The apparatus of claim 1, wherein the buffer comprises a tail buffer and a head buffer.

7. The apparatus of claim 1, wherein the buffer comprises a queue cache slice allocated per egress port group.

8. The apparatus of claim 1, wherein the memory is to permit a single queue to use an entirety of the memory to store tags and packet data from one or more ingress ports.

9. The apparatus of claim 1, comprising an ingress port group and third circuitry to maintain packets as non-interleaved for an ingress port to reduce underrun and provide cut-through.

10. The apparatus of claim 9, wherein the third circuitry is to prevent packets that are store-and-forward from blocking cut-through packets.

11. The apparatus of claim 1, comprising one or more of: a network interface, switch, data center, server, rack, or blade and wherein the network interface, switch, data center, server, rack, or blade include the circuitry.

12. The apparatus of claim 11, comprising a server, wherein the server is to process packets prior to egress and perform packet processing based on one or more of:
software defined networking (SDN) or network function virtualization (NFV).

13. A method comprising:
associating a tag with a packet;
storing tags as a group into a memory; and
using a tag delivery path to provide a tag to a buffer associated with an egress port, wherein the tag delivery path is to provide lower latency tag access to the egress port than that of the memory and wherein the tag delivery path provides tag delivery independent of accesses to the memory.

14. The apparatus of claim 1, wherein:
the memory is to store tags and packets and
the memory is shared among multiple ingress ports.

15. The method of claim 13, comprising:
maintaining packets received at an ingress port as non-interleaved to reduce underrun and provide cut-through to an egress port.

16. The method of claim 13, comprising:
scheduling egress of a packet from an egress port by access of its tag, wherein:
if the tag is in the buffer associated with the egress port, reading the tag from the buffer and
if the tag is not stored in the buffer, reading the tag from the memory.

17. The method of claim 13, comprising:
storing a number of tags in the buffer to attempt to have an available tag to achieve a packet egress rate from an egress port whether a tag is retrieved from the buffer or the memory and
storing tags in the buffer in a packet egress order.

18. The method of claim 13, comprising permitting a tag queue to use an entire memory, wherein the tag queue stores tags and packet data from one or more ingress ports.

19. The method of claim 13, wherein storing tags as a group into a memory comprises collating a threshold number of tags and storing the threshold number of tags into the memory.

20. The method of claim 13, comprising:
storing a received packet in the memory and
performing packet processing on the received packet stored in the memory.

21. The method of claim 13, comprising:
storing tags and packets in the memory, wherein the memory is shared among multiple ingress ports.

22. A system comprising:
a memory and
a switch comprising:
  at least one ingress port;
  at least one egress port;
  circuitry to provide a path for tag delivery; and
  at least one processor configured to:
    associate a tag with a received packet;
    store tags as a group into the memory; and
    use the circuitry to provide the tag to a buffer associated with an egress port, wherein the circuitry is to provide lower latency tag access to the egress port than that of the memory and wherein the circuitry to provide tag delivery independent of access to the memory.

23. The system of claim 22, comprising second circuitry and wherein:
the tag is to identify a location of a portion of the received packet in the memory and
the second circuitry is to access the tag, wherein to access the tag, the second circuitry is to attempt to access the tag from the buffer and if the tag is absent from the buffer, attempt to access the tag from the memory.

* * * * *